(12) United States Patent
Ringer et al.

(10) Patent No.: US 9,683,668 B2
(45) Date of Patent: Jun. 20, 2017

(54) DUAL-PURPOSE FLUID CONTROL VALVE

(75) Inventors: Yoram Ringer, Providence, RI (US);
George V. Simonin, Johnston, RI (US);
Anthony Iasa, Barrington, RI (US);
John R. Iasa, Jr., legal representative, Barrington, RI (US); Su Yang, Providence, RI (US)

(73) Assignee: Tyco Fire Products LP, Lansdale, PA (US)

( * ) Notice: Subject to any disclaimer, the term of this patent is extended or adjusted under 35 U.S.C. 154(b) by 1248 days.

(21) Appl. No.: 13/377,816

(22) PCT Filed: Jun. 15, 2010

(86) PCT No.: PCT/US2010/038698
§ 371 (c)(1),
(2), (4) Date: Jul. 27, 2012

(87) PCT Pub. No.: WO2010/148005
PCT Pub. Date: Dec. 23, 2010

(65) Prior Publication Data
US 2013/0032236 A1    Feb. 7, 2013

Related U.S. Application Data

(60) Provisional application No. 61/218,324, filed on Jun. 18, 2009, provisional application No. 61/246,505, filed on Sep. 28, 2009.

(51) Int. Cl.
*F16K 11/048*  (2006.01)
*F16K 11/10*   (2006.01)
*A62C 35/68*   (2006.01)

(52) U.S. Cl.
CPC ............ *F16K 11/048* (2013.01); *A62C 35/68* (2013.01); *F16K 11/105* (2013.01); *Y10T 137/86694* (2015.04); *Y10T 137/8778* (2015.04)

(58) Field of Classification Search
CPC ...... F16K 11/105; F16K 11/048; A62C 35/68; Y10T 137/86694; Y10T 137/8778
(Continued)

(56) References Cited

U.S. PATENT DOCUMENTS 2,577,337 A    12/1951  Lancaster
2,876,788 A *   3/1959  Shube .................. F16K 11/048
                                                       137/112
(Continued)

FOREIGN PATENT DOCUMENTS

WO    WO 2007/022578 A1    3/2007

OTHER PUBLICATIONS

International Searching Authority, Written Opinion issued in International Application No. PCT/US10/038698, Aug. 24, 2010, 22 pages.
(Continued)

*Primary Examiner* — Craig Schneider
*Assistant Examiner* — Frederick D Soski
(74) *Attorney, Agent, or Firm* — Perkins Coie LLP

(57) ABSTRACT

A dual-purpose fluid control valve for controlling the flow of fluid to separate systems supplied by the valve. The control valve includes a body having an inlet, a first outlet, and a second outlet. The valve further includes means for controlling a rate of fluid through one outlet based on a fluid demand at the outlet while controlling the rate of fluid flow through the other outlet.

24 Claims, 19 Drawing Sheets

(58) Field of Classification Search
USPC .......... 137/80, 83.03, 83.04, 118.02, 118.04,
137/118.06, 119.01, 119.06, 119.09,
137/512.1, 533.23, 625.13, 625.26, 881,
137/883
See application file for complete search history.

(56) References Cited

U.S. PATENT DOCUMENTS

| | | | | |
|---|---|---|---|---|
| 3,346,051 | A | | 10/1967 | Merdinyan |
| 3,559,670 | A | * | 2/1971 | Yedidiah ........................ 137/110 |
| 4,095,611 | A | * | 6/1978 | Hetz ........................ 137/115.23 |
| 4,243,064 | A | | 1/1981 | Nolte |
| 4,385,640 | A | * | 5/1983 | Iverson .................... 137/115.05 |
| 4,509,686 | A | | 4/1985 | Larsen |
| 4,638,831 | A | * | 1/1987 | Lindgren ................. 137/115.05 |
| 4,779,639 | A | * | 10/1988 | Loos et al. ............... 137/115.05 |
| 4,941,502 | A | * | 7/1990 | Loos et al. ............... 137/115.05 |
| 5,236,002 | A | * | 8/1993 | Martin et al. ............ 137/119.06 |
| 5,549,131 | A | * | 8/1996 | Maxwell et al. ......... 137/115.18 |
| 6,357,467 | B1 | * | 3/2002 | Ringer ..................... 137/119.01 |
| 7,334,597 | B1 | * | 2/2008 | Hughes et al. .......... 137/115.17 |
| 8,267,112 | B2 | * | 9/2012 | Liu ........................ F16K 19/006 137/119.04 |
| 2004/0055763 | A1 | | 3/2004 | Petersen |
| 2009/0272549 | A1 | * | 11/2009 | Feenstra ............... F16K 31/128 169/17 |
| 2010/0012197 | A1 | * | 1/2010 | Liu ........................ E03C 1/023 137/119.04 |
| 2010/0206391 | A1 | * | 8/2010 | McNeely et al. ........ 137/115.05 |
| 2010/0243929 | A1 | * | 9/2010 | Tondolo ................ F15B 13/042 251/62 |

OTHER PUBLICATIONS

International Searching Authority, International Search Report issued in International Application No. PCT/US10/038698, Aug. 24, 2010, 3 pages.

* cited by examiner

DUAL-PURPOSE FLUID CONTROL VALVE

PRIORITY DATA AND INCORPORATION BY REFERENCE

This application is a 35 U.S.C. §371 application of International Application No. PCT/US2010/038698, filed Jun. 15, 2010, which claims the benefit of priority to U.S. Provisional Patent Application Nos. 61/218,324, filed Jun. 18, 2009 and 61/246,505, filed Sep. 28, 2009, each of which is incorporated by reference in its entirety.

TECHNICAL FIELD

This invention relates generally to fluid control valves and more particularly to dual-purpose shut-off valves for use in fluid systems to control the supply of fluid, such as for example, water in a fire protection system and domestic water systems of a residence.

BACKGROUND OF THE INVENTION

Known fluid control valves are shown in Tyco Fire & Building Products (now Tyco Fire Suppression & Building Products) Technical Data Sheet TFP980 (January 2005) (rev. January 2006) entitled, "Model RSV-1 Residential Domestic Shutoff Valve 1 and 2 Inch (DN25 and DN50) For Dual Purpose Residential Water Supply," and the May 2007 TFP980 data sheet entitled, "Model RSV-1 Residential Domestic Shutoff Valve 1 Inch (DN25) For Dual Purpose Residential Water Supply." Patent documents showing and describing shut-off valves include: U.S. Pat. Nos. 6,357,467; 5,236,002 and PCT International Patent Application Publication No. WO 2007/022578.

SUMMARY OF THE INVENTION

Provided is a dual-purpose fluid control valve to control the flow of supply fluid to distinct fluid systems, such as for example, a domestic water supply system and a residential fire protection system. In particular, the valve of the present invention preferably operates to provide for an increase in fluid flow to one system in response to an increase in fluid demand in the one system, while decreasing fluid flow to the other system. In one preferred embodiment, the preferred dual-purpose fluid control valve includes a body that defines an orifice between a first chamber having a fixed volume and a second chamber having a fixed volume. The preferred valve further includes a first fluid outlet in communication with the first chamber, a second fluid outlet in communication with the second chamber, and means for controlling a rate of fluid through the second chamber based on a fluid demand at the second fluid outlet while controlling another rate of fluid flow from the first chamber to the first fluid outlet.

In another aspect, the preferred valve includes a single inlet in communication with two outlets in which a preferred means includes a flow controller to control the flow of fluid from the inlet to each of the outlets. The preferred valve operation of the present invention provides for an increase in fluid flow to one outlet in response to an increase in system demand requirements of the one outlet, while decreasing fluid flow to the other outlet. In the preferred operation of the valve, a minimum amount of fluid is supplied to the outlet of reduced flow. The assemblies of the preferred valve embodiments further provide for a standby condition in which a single fixed seal surface is engaged by a movable seal to prevent or obstruct flow to a first outlet of the valve and provide fluid flow to the second outlet. In operation of the preferred assembly, the spacing between the movable seal and the fixed seal surface is varied in relation to the fluid demand of the system supplied by the first outlet, and fluid flow is reduced or alternatively sealed off from the second outlet.

One preferred embodiment of a dual purpose fluid control valve provides a valve that includes a valve body having a valve body wall defining an interior chamber and further defining first and second ports preferably disposed on a longitudinal axis and a third port disposed on another axis skewed relative to and more preferably transverse to the longitudinal axis. The valve body wall further preferably defines a sealing surface, and more preferably a fixed sealing surface, disposed within the interior chamber along the longitudinal axis between the first and second ports. A flow controller is moveably disposed within the interior chamber preferably along the longitudinal axis. The flow controller has a first component with an operating position that defines a minimum distance between the first component and the sealing surface. A second component of the flow controller has a varying distance relative to the sealing surface when the first component is in the operating position.

Another embodiment provides a valve for directing a flow of water through the valve. The valve includes a valve body having a valve body wall defining first and second ports disposed on a longitudinal axis and further defining a third port disposed on another axis transverse to the longitudinal axis. An inner surface of the valve body wall defines an interior chamber of the valve body between the first, second, and third ports; the inner surface further defines a fixed seat. A flow controller having a first component and at least a second component is moveably disposed within the interior chamber. The flow controller has standby and operating positions within the valve body. The flow controller is disposed to move between the standby and operating positions relative to the valve body wall. The valve also includes a single elastomeric seal disposed on one of the components of the flow controller.

In an alternate embodiment, a valve includes a body having a valve body wall defining an interior chamber. The valve body wall defines first and second ports communicating with the interior chamber along a longitudinal axis and further defines a third port communicating with the interior chamber along another axis transverse to the longitudinal axis. The valve body wall defines a sealing surface, and more preferably a fixed sealing surface, disposed about the longitudinal axis within the interior chamber. The valve body wall further preferably defining another mating surface disposed about the longitudinal axis between the sealing surface and the first port. A flow controller is disposed within the interior chamber and has an exterior surface at least in part disposed about the longitudinal axis. The flow controller preferably has an operating position within the interior chamber that disposes an end of the flow controller at a minimum distance relative to the sealing surface. The operating position also disposes the exterior surface proximate to the mating surface to maintain a spacing between the exterior and mating surfaces.

Another embodiment provides for a method of operating a fluid control valve that includes sealing a first flow path between first and second ports of a hollow valve body with a flow controller having coupled first and second components moveably disposed within the hollow valve body between the first and second ports defined by a wall of the body. The sealing includes an engagement between the second component and a sealing surface defined by the hollow valve body wall. The method further includes moving the first component of the flow controller to a minimum distance relative to a sealing surface, and obstructing a second flow path between the first port and a third port defined by the hollow valve body wall. The method also includes moving the second component to disengage the second component from the sealing surface and unseal the first flow path, and moving the second component in a direction away from the first component.

Another method provides for directing a flow of water through an annular gap defined by a spacing between a valve body wall and a flow controller disposed in a standby position within an interior chamber of the valve body. The method includes defining a first annular gap dimension, and moving the flow controller along a longitudinal axis of the valve body wall from a standby position to an operating position that reduces the annular gap to a smaller second annular dimension.

A preferred embodiment of the fluid control valve provides for a dual purpose residential shut-off valve for a nominal two inch (2 in.) supply pipe of a fire protection system and a nominal two inch supply pipe to a domestic water system. In operation, the preferred valve supplies a flow of fluid to a fire sprinkler based upon the water demand requirement of the fire protection system with a minimal amount of water being supplied to the domestic water system. The minimal amount of water supplied to the domestic water system when the valve operates is preferably the minimum amount necessary to permit the fluid pressure to equalize at the valve inlet and outlets when the valve is isolated or shut-off from the fluid supply such that the valve can reset to the non-actuated position. The preferred shut-off valve in operation further preferably provides 150 gpm from the valve outlet with a head loss or differential pressure across the valve of no more than three pounds per square inch (3 psi.).

Accordingly, the preferred valve provides for fluid flow to a fire sprinkler system and further provides for controlling the flow of water between a domestic water system and the fire protection system. The preferred valve includes a valve body having a proximal end and a distal end. An inlet at the distal end of the body is provided for connection to a water supply, a first outlet is located at the proximal end of the body for connection to a fire sprinkler system, and a second outlet is preferably located between the inlet and the first outlet for connection to a domestic water system. An inner surface of the valve body preferably defines an interior chamber and a central longitudinal axis of the valve body. The inlet is preferably centrally aligned with the central longitudinal axis and in communication with the central chamber in order to feed water into the chamber. The first outlet is preferably centrally aligned along the central longitudinal axis and in communication with the interior chamber to supply water to the fire sprinkler system, and the second outlet is preferably disposed between the inlet and the first outlet centrally aligned along an axis perpendicular to the central longitudinal axis and in communication with the interior chamber for supplying water to the domestic water system. The inner surface of the valve body further preferably defines a sealing surface about the central longitudinal axis and a stop surface about the central longitudinal axis. The stop surface is preferably spaced with respect to, and preferably distally of, the sealing surface so as to divide the chamber and separate the inlet and first and second outlets.

In the preferred valve, a flow controller is disposed within the interior chamber centrally aligned to the central longitudinal axis. The preferred flow controller has a sealer including a head portion biased against the sealing surface and a shaft portion depending from the head portion having a proximal and a distal end. An occluder is preferably disposed about the shaft portion of the sealer such that the occluder can translate between an initial position at the proximal end of the shaft and a final position at the distal end of the shaft. A spring is provided and preferably coupled to the shaft portion of the sealer so as to bias the occluder in the initial position. The spring has a compressed length to locate the occluder along the shaft portion of the sealer distal of the initial position.

In one preferred embodiment of the sealer, a wall is provided defining a central bore. Disposed within the bore is a weight member having a wider proximal portion to define the head portion of the sealer and a narrower distal portion defining the shaft portion of the sealer. The wider proximal portion of the weight member preferably includes a seal for engaging the sealing surface. The narrow distal portion of the member is preferably threaded for engagement with a threaded end cap having a multi-faceted flange for supporting the spring about the shaft portion of the sealer. To assist in the assembly of the preferred sealer, a multi-faceted tool engaging surface is preferably disposed atop the proximal portion of the weight member. A wrench or other tool engaged with the tool engaging surface can support the weight member to allow the end cap to be threaded about the threaded distal end of the weight member.

The preferred occluder has a proximal end and a distal end with openings at the proximal and distal ends. The opening at the proximal end of the occluder is preferably defined by a frame that includes a strut member that bisects the opening at the proximal end of the occluder. The strut preferably includes a central bore for housing the shaft portion of the sealer. The strut further preferably tapers narrowly in the proximal-to-distal direction so as to define a cross-sectional geometry that narrows in the proximal-to-distal direction. The cross-sectional geometry of the strut member can be substantially constant as the strut member extends radially from the center of the occluder; or alternatively, the cross sectional geometry of the strut member can vary as the strut member extends radially from the center of the occluder.

In operation of the preferred valve, the flow controller translates between the sealing surface and the stop surface to control a flow of water from the inlet to each of the first and second outlets so as to alternately define a sealed and unsealed condition and more preferably define a standby (sealed) condition, and a tripped/operated (unsealed) condition of the valve. In the standby condition the head portion of the sealer is in engagement with the sealing surface to prevent the flow of fluid to the first outlet and the occluder is spaced from the stop surface such that a substantial majority of the water flows to the second outlet, wherein the tripped condition the head portion of the sealer is spaced from the sealing surface and the occluder is engaged with the stop surface to permit the flow of water to the first outlet and a reduction in flow to the second outlet. In the operated condition the spring is compressed to the compressed length and the occluder and the shaft portion translate relative to one another, the compressed length of the spring being variable as a function of the pressure differential across the valve.

BRIEF DESCRIPTIONS OF THE DRAWINGS

The accompanying drawings, which are incorporated herein and constitute part of this specification, illustrate exemplary embodiments of the invention, and, together with the description given above, serve to explain the features of the invention.

DETAILED DESCRIPTION

Figure 1:
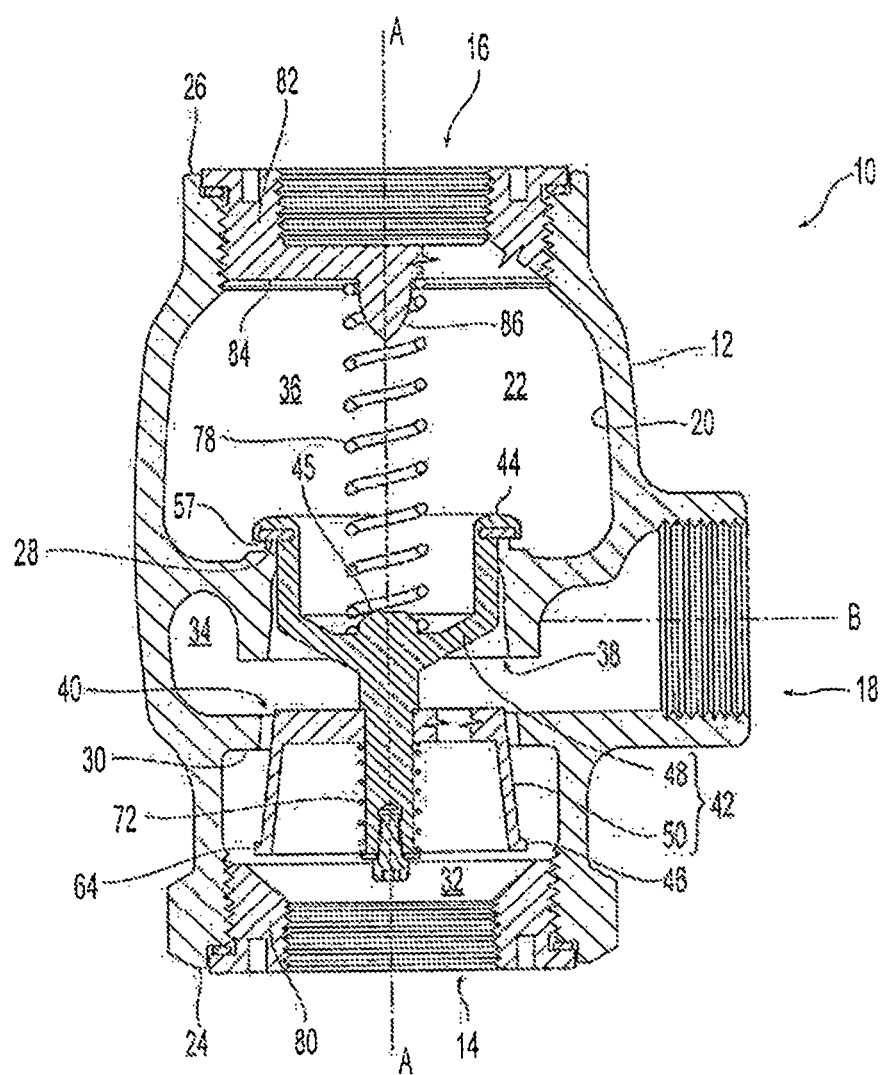
FIG. 1 is a cross-sectional view of a first embodiment of a preferred fluid control valve in a standby condition.
Figure 2:
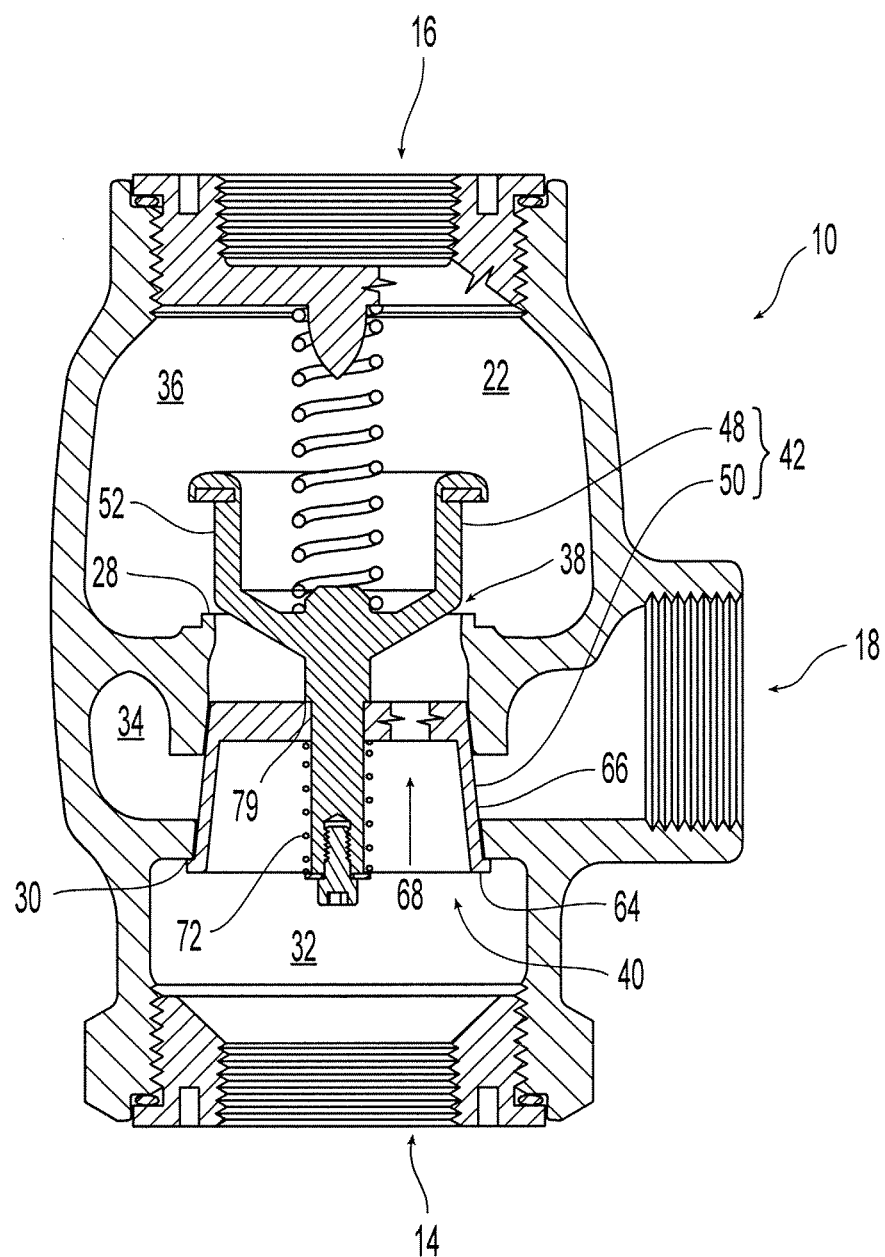
FIG. 2 is a cross-sectional view of the fluid control valve of FIG. 1 in a tripped condition.
Figure 3:
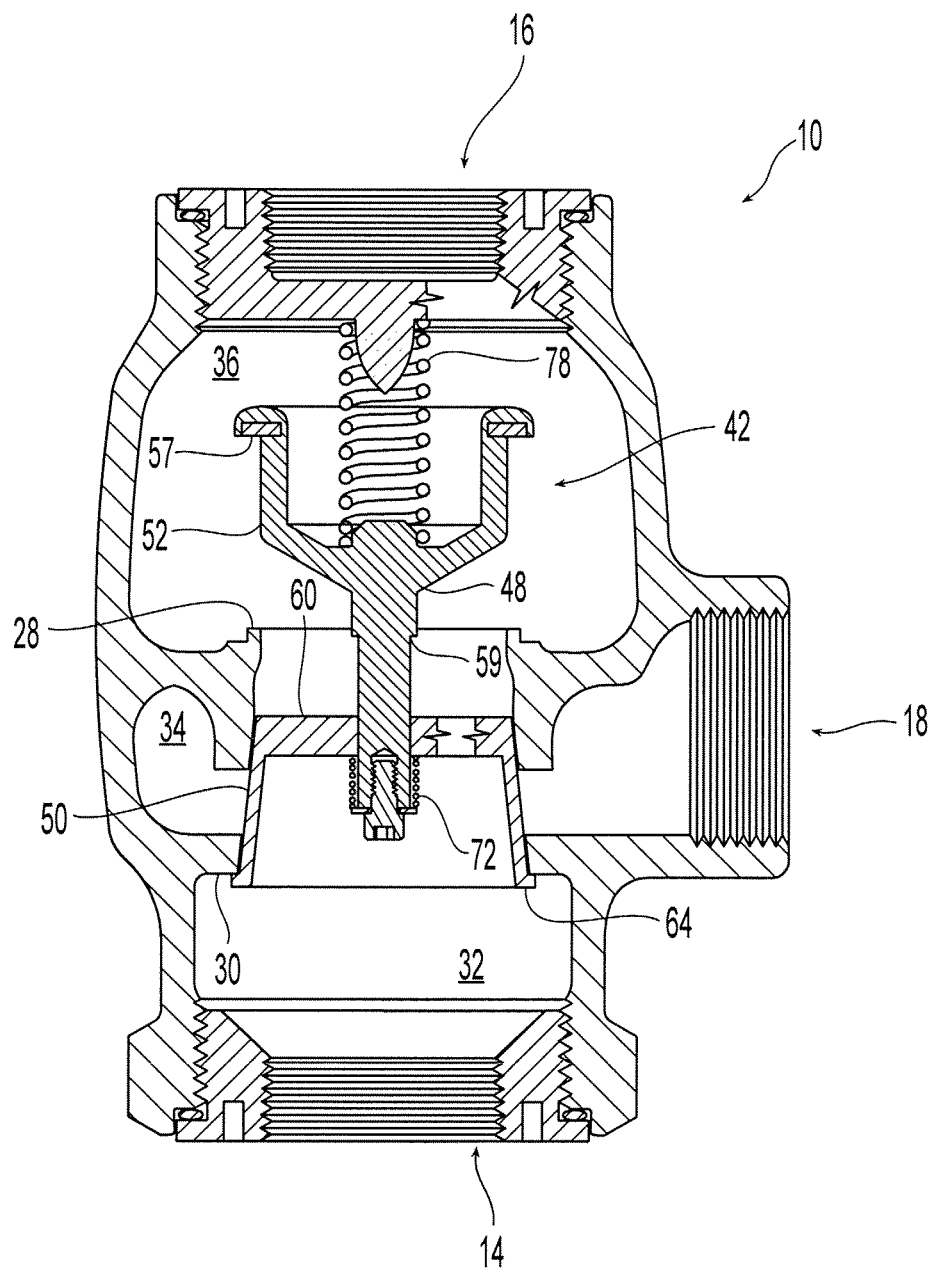
FIG. 3 is a cross-sectional view of the fluid control valve of FIG. 1 in a fully operated condition.

Shown in FIGS. 1, 2 and 3 is a preferred embodiment of a dual-purpose fluid control valve 10 in various operating conditions. The valve 10 includes a main body 12 having at least three ports, for example, an inlet 14 for connection to a fluid supply line and a first and a second outlet 16, 18 for service of two separate and substantially isolated fluid systems. The valve 10 is preferably configured for service as a dual-purpose residential shut-off valve 10 in which the inlet 14 is to be connected to a domestic water supply line for service of a both a residential fire protection system and potable domestic water supply system. More specifically, the valve 10 is configured for installation in a pipe riser system in which the inlet 14 is connected to the domestic water supply, the first outlet 16 is connected to the main feed line for an automatic fire sprinkler system, and the second outlet 18 is connected to the domestic water system.

Figure 1A:
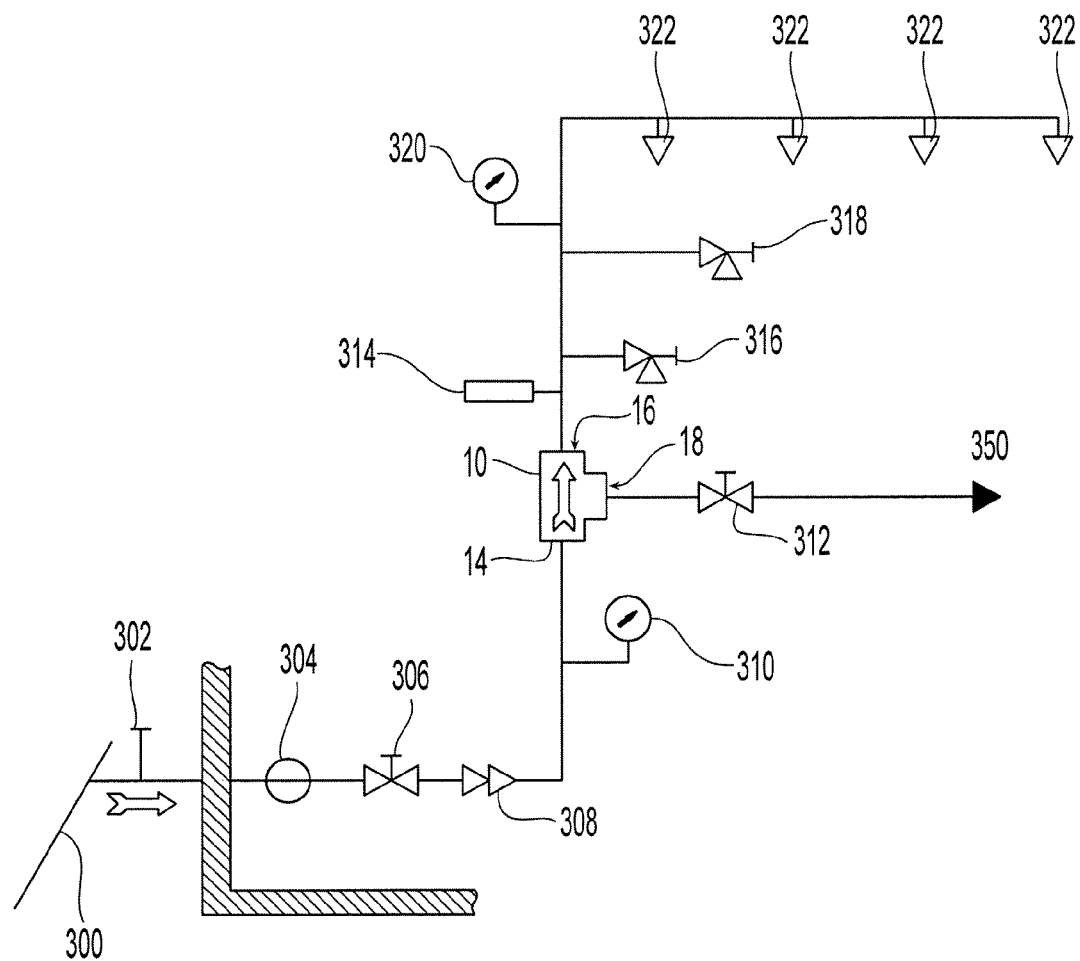
FIG. 1A is a schematic view of a preferred fluid control valve in a dual-purpose residential installation.

Schematically shown in FIG. 1A is the valve 10 in a typical dual-purpose residential installation with the fire protection system components coupled to the first outlet 16 and the domestic system components 350 coupled to the second outlet 18. As a residential shut-off valve, the valve 10 in its standby mode can act as a riser check valve for the automatic fire protection system, and in its actuated mode, the valve 10 controls the flow of water to the domestic side and provides a variable supply of water to the fire protection system in response to the demand of the fire protection system for water.

For the typical installation, a domestic control valve 312 is located between the valve 10 and the remainder of the domestic water system 350, and is more preferably located within 12 inches of the second outlet 18 of the valve 10. Preferably disposed along the riser downstream from the first outlet 16 of the valve 10 are components of the fire protection system, which preferably include a water flow detector or alarm 314, an alarm test connection 316, a drain and flow test connection 318, and a fire sprinkler system pressure gauge 320. Spaced along branch supply lines are a plurality of fire protection sprinklers 322 that are supplied water from the valve 10. Preferably located adjacent the most hydraulically remote sprinkler 322 is an inspector's test connection (not shown).

Coupled to the inlet port 14 of the valve 10 is the water supply 300. Preferably disposed upstream of the valve 10 is a water supply gate valve 302, a water meter 304 and main control valve 306. Preferably disposed between the main control valve 306 and the valve 10 are the backflow preventer 308 and water supply pressure gauge 310.

Referring again to FIG. 1, the inner surface 20 of the body 12 forms an interior chamber 22 that preferably defines the central longitudinal axis A-A of the valve 10. The interior chamber 22 is placed in communication with each of the inlet 14 and outlets 16, 18. Preferably, the inlet 14 and the first outlet 16 are centered and axially spaced apart along the axis A-A with the inlet 14 located at the distal end 24 of the body 12 and the first outlet 16 at the proximal end 26 of the body 12. The second outlet 18 is preferably located between the inlet 14 and the first outlet 16. More preferably, the second outlet 18 is centered along an axis that is perpendicular to the longitudinal axis A-A between the inlet 14 and first outlet 16. Alternatively, the inlet 14 and outlets 16, 18 can be off axis relative to one another and/or disposed on axes skewed with respect to the longitudinal axis A-A of the valve 10.

The inner surface 20 of the body 12 further preferably divides the interior chamber 22 into portions of preferably fixed or constant volumes. More specifically, the inner surface 20 preferably includes a sealing surface 28 and a stop surface 30 which are preferably fixed with respect to the inlet 14 and outlets 16, 18. The a scaling surface 28 and a stop surface 30 are preferably spaced apart to define three portions: a supply chamber portion 32 that is in direct communication with the inlet 14; a domestic supply chamber portion 34 in direct communication with. the second outlet 18; and a fire protection supply chamber portion 36 in direct connection with the first outlet 16. The inner surface 20 further preferably defines a first interior passageway 38 and a second interior passageway 40 which are spaced apart and centrally axially aligned along the axis A-A. Each of the first and second interior passageways 38, 40 have a proximal end and a distal end to define an orifice in which the sealing surface 28 is preferably located at the proximal end of the first interior passageway 38 and the stop surface 30 is preferably located at the distal end of the second passageway 40.

Disposed within the interior chamber 22 of the valve 10 is means for controlling a rate of fluid through one chamber of the valve 10, for example, the means can control the rate of fluid flow through the fire protection portion 36 based on a fluid demand at the first outlet 16 while controlling the rate of fluid flow to the second outlet 18. More specifically, the valve 10 preferably includes a flow controller 42 for controlling the flow of water between the inlet 14 and supply portion 32 of the valve 10 and the domestic and fire protection portions 34, 36 of the valve 10. The flow controller 42 has a proximal end 44 and a distal end 46. To control and more preferably regulate the flow of water in the valve 10, the flow controller translates axially along the axis A-A within the first and second interior passageways 38, 40 so as to alternately i) prevent fluid flow from the inlet 14 to the first outlet 16 and supply fluid flow to the second outlet 18; and ii) significantly reduce fluid flow to the second outlet 18 and divert the majority of the fluid flow to the first outlet 16. Preferably, the flow controller 42 translates such that the proximal and distal ends 44, 46 respectively and alternately engage the sealing surface 28 and stop surface 30 to provide the desired fluid control.

Figure 1B:
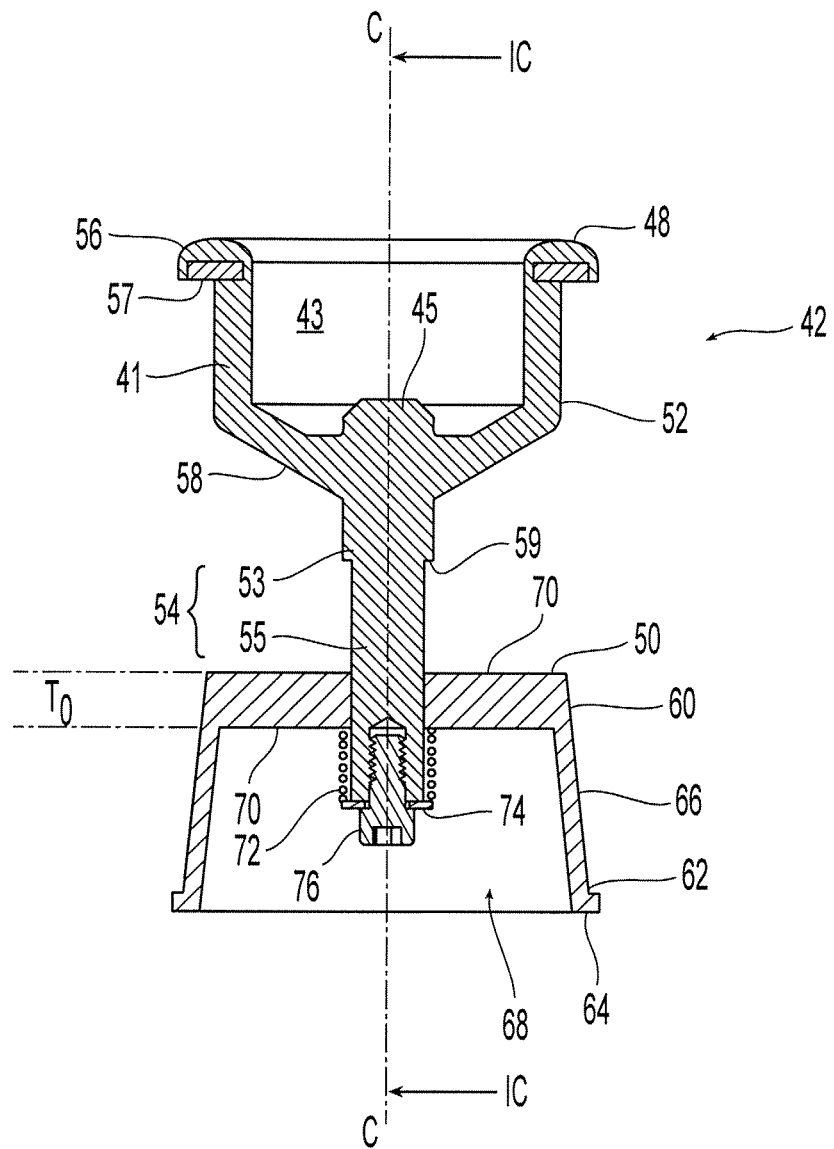
FIG. 1B is a detailed cross-sectional view of an occluder used in the valve of FIG. 1.
Figure 1C:
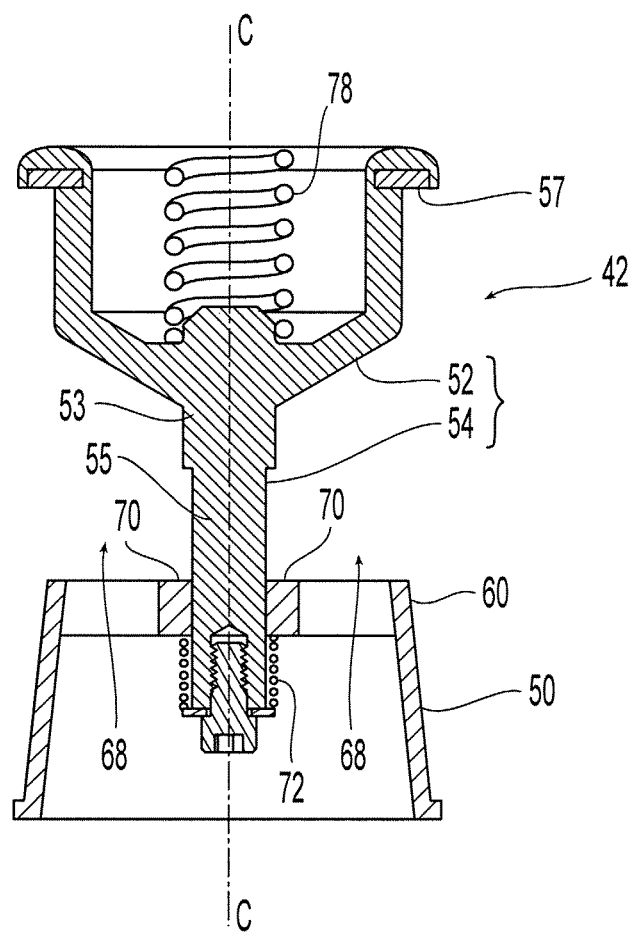
FIG. 1C is another detailed cross-sectional view of the occluder used in the valve of FIG. 1 along line IC-IC in FIG. 1B.

The flow controller 42 includes two components that can translate with respect to one another along the axis A-A between the fire protection and domestic chamber portions 36, 38 of the valve 10. Preferably, the flow controller 42 includes a sealer 48 and an occluder 50. Referring to FIGS. 1B and 1C, shown are detailed views of the flow controller 42. The sealer 48 preferably includes a head portion 52 and a shaft portion 54 depending from the head portion 52 and extending along a central axis C-C. The head portion 52 is generally a cylindrical member having a proximal end 56 and a distal end 58 with an annular wall 41 extending therebetween circumscribing the central axis C-C to define a chamber 43 with a single opening at the proximal end 56 of the head portion 52. Preferably located centrally at the bottom of the chamber 43 is a post 45 for engaging a biasing member such as, for example, a spring. The proximal end 56 preferably defines the widest portion of the head portion 52 for engagement with the sealing surface 28 of the body 12. More preferably, the head portion 52 includes a gasket or seal surface 57 for mating and forming a fluid tight seal with the sealing surface 28 of the body 12 with the remainder of the sealer 48 extending through the first and second passageways 38, 40 along the axis A-A of the valve, The preferred seal surface 57 is preferably a separate seal element of EPDM material per ASTM D2000, The head portion 52 and shaft portion 54 are preferably formed integrally with one another. More preferably, the distal portion 58 converges toward the central axis C-C to transition to the shaft portion 54 and define a preferably substantial frustrum geometry.

The shaft portion 54 preferably includes a proximal shaft portion 53 and a thinner distal shaft portion 55 with a transition therebetween defining an annular shoulder 59. Disposed about the shaft portion 54 and more preferably disposed about the distal shaft portion 55 is the occluder 50. The occluder 50 includes a proximal end 60 and a distal end 62 preferably defining a cylindrical member. More preferably, the occluder 50 defines a frustrum in which the widest portion of the occluder 50 is preferably located at the distal end 62 for engagement with the stop surface 30 or other interior projection of the valve body 12. More specifically, the distal end 62 of the occluder 50 includes an annular ring 64 shaped to mate with the stop surface 30. The annular wall 66 preferably circumscribes the central axis C-C with openings at the proximal and distal ends 60, 62 to define a flow path 68 (shown in FIG. 1C) through which fluid can flow. The opening at the proximal end 60 is preferably defined by a frame that includes a strut member 70 that preferably bisects the opening at the proximal end of the occluder. The strut member 70 includes a central bore or channel in which the distal shaft portion 55 of the sealer 48 is disposed. The central bore of the strut member 70 is preferably sized so that the occluder 50 can translate over the distal shaft portion 55.

Preferably disposed about and coupled to the distal end of the shaft portion 55 is a sealer spring member 72 to resiliently position the head portion 52 and occluder 50 relative to one another. The proximal end of the sealer spring 72 preferably engages the strut member 70 of the occluder 50 and the distal end of the sealer spring 72 preferably engages a washer 74 secured to the distal end of the shaft portion 54 by a set screw. The sealer spring 72 biases the occluder 50 against the shoulder 59 of the shaft portion 54 so that in the standby condition, the sealer locates the occluder 50 distally to maximize fluid flow to the second outlet 18.

The preferred controlling means of the valve 10 regulates the flow of fluid out of the outlets of the valve in response to a change in demand for fluid from one of the systems supplied by the valve 10. Upon actuation of the valve 10, the flow controller 42 preferably regulates the flow of fluid to the first outlet 16 in response to, for example, an open sprinkler in a fire protection system. The sealer spring 72 provides, in response to increased fluid demand at the outlet 16, a resilient axial translation of the occluder 50 about the shaft portion 52 from its initial proximal position at the shoulder 59 to the most distal position so as to compress the sealer spring 72 from an initial spring length to its most compressed length as shown in FIG. 1B. The sealer spring 72 has a preferred free length of 1.5 inches with a spring rate ranging from about 5 to about 10 pound-force per inch (lbs./in.) with about seven coils to provide for an approximate load ranging from about six to about ten pounds at its solid height. Preferably, the sealer spring has a spring rate of about 8.3 lbs./in. with about 7.2 coils to provide for an approximate load at its solid height of about 10 lbs. More preferably, the sealer spring 72 has a preferred spring rate of about 5.4 lbs./in. with 7.5 coils to provide for an approximate load at its solid height of about 6.1 lbs. The preferred sealer spring 72 is constructed from 0.049 inch diameter stainless steel wire passivated per ASTM A967. The preferred sealer spring 172 is provided by Lee Spring Co. identified by Part #LC 049H 06 S; #LC 045H 06 S or an equivalent thereof.

Referring again to FIG. 1, the flow controller 42 is installed within the interior chamber 22 with the head portion 52 and occluder 50 respectively radially spaced from the first and second interior passageways 38, 40. The interior or mating surface 20 forming the first and second interior passageways 38, 40 are preferably substantially parallel to the external surfaces of each of the walls 41, 66 of the head portion 52 and occluder 50 so as to form annular gaps therebetween. In a preferred assembly of the fluid control valve 10, the peripheral surface of the head portion 52 defines a minimum radial gap width of about 0.065 inches from the interior or mating surface of the first interior passageway 38, and the peripheral surface of the occluder 50 defines a minimum radial gap width of about 0.005 inches from the interior or mating surface of second interior passageway 40. More preferably, the first and second interior passageways 38, 40 together define decreasing cross-sectional areas in the distal-to-proximal direction. Given the preferred geometry of the head portion 52, the gap width between the head portion 52 and the inner surface of the first interior passageway 38 increases as the flow controller 42 axially translates from the sealing surface 28 in the proximal direction.

In the embodiment of the valve 10 in FIG. 1, a downstream spring 78 biases the flow controller 42 and more particularly the head portion 52 against the sealing surface 28. The downstream spring 78 preferably extends axially along the central longitudinal axis A-A with the proximal end of the downstream spring 78 fixed to a proximal portion of the valve 10 and the distal portion of the downstream spring 78 fixed to the central post 45 formed in the chamber 43 of the head portion 52. The downstream spring 78 preferably has a free length of about five inches (5 in.) with a spring rate of about 10 lbs./in. with seventeen (17) coils to provide for a approximate load at its solid height of about 14 lbs.

Figure 1D:
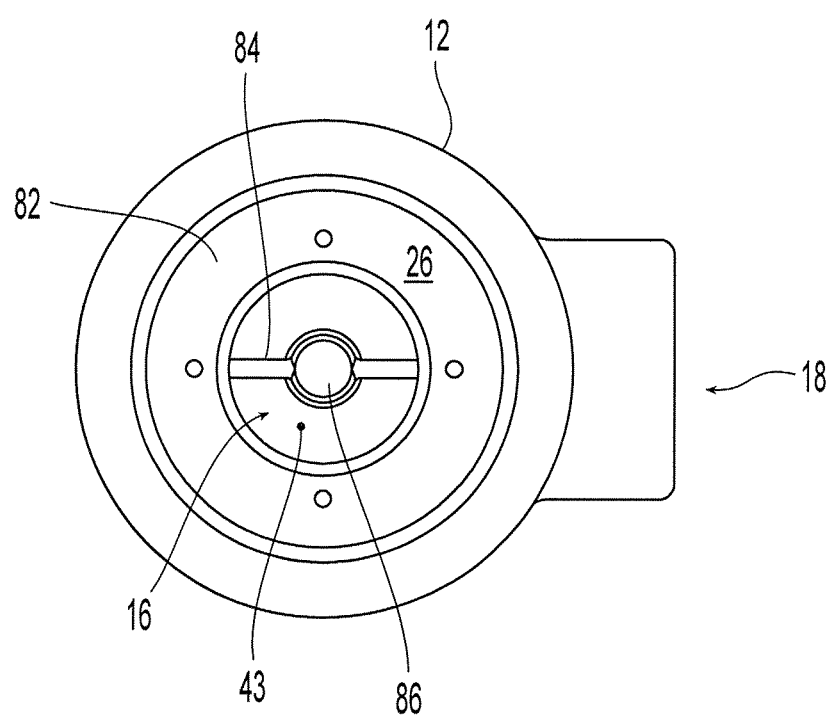
FIG. 1D is a plan view of the fluid control valve of FIG. 1.

In the preferred valve installation as a dual-purpose residential shut-off valve, a feed pipe from the domestic water supply is preferably threaded into the valve inlet 14. The valve 10 preferably includes a threaded inlet insert 80 that is threaded into the inlet 14. The threaded insert is preferably sized for receipt of a nominal two inch feed pipe. A main feed line of a residential sprinkler system is coupled to the first outlet 16 of the valve 10. Preferably threaded into the first outlet 16 is a threaded outlet insert 82 for connection to the nominal two inch feed pipe. As shown in FIG. 1 and FIG. 1D, the outlet insert 82 preferably includes a strut member 84 to bisect the first outlet 16 and about which the fluid can flow to discharge out the first outlet 16. The strut member 84 of the outlet insert 82 further preferably includes a post 86 for supporting the proximal end of the downstream spring 78. The valve 10 is illustrated with the valve axis A-A oriented vertically along the direction of gravity. However, because of the presence of the downstream spring 78 providing a biasing force against the flow controller 42, the valve 10 can be installed with the axis A-A in an alternate orientation, such as for example, horizontal to the direction of gravity. The second outlet 18 of valve 10 is preferably coupled to a domestic supply feed line for the domestic water system.

With the preferred shut-off valve 10 installed, the valve 10 has a sealed and unsealed condition and more preferably: i) a standby (sealed) condition; and ii) an unsealed condition having an initial tripped condition with a final fully open operated condition, depending on the hydraulic demands of the systems to which the valve 10 is connected. The fluid control valve has a standby condition in which the valve 10 obstructs or seals off water flow from the inlet 14 to the first outlet 16 and substantially all the fluid flow is directed to the domestic supply portion 34 and the second outlet 18 for water supply to domestic systems.

FIG. 1 shows the internals of the valve 10 when the valve is in the standby condition. In the standby condition, the flow controller 42 is in its most distal position with the seal surface 57 of the head portion 52 fully engaged with the sealing surface 28 of the interior chamber 22 to seal off or obstruct fluid flow to the first outlet 16. Accordingly, the preferred fluid control valve 10 and its assembly provides for a single fixed seal surface that is engaged by a movable seal to prevent or obstruct flow to at least one outlet of the riser. The remainder of the head portion 52 is substantially housed within the first interior chamber 38. The flow controller 42 is held down against the sealing surface 28 and the fluid pressure from the incoming fluid supply distal of, or below, the sealing surface 28. In addition to the downward bias provided by the downstream spring 78, the head portion 52 of the sealer 48 is held downward against the sealing surface by the static fluid pressure proximal to or above the head portion 52. The fluid pressure of the fire protection sprinkler system coupled to the first outlet 16 provides the static pressure to hold the flow controller 42 in its sealed position against the sealing surface 28. The fire protection sprinkler system can be a wet system in which the water pressure in the piping network of the fire protection sprinkler system acts on the head portion 52 to hold the flow controller 42 in the sealing or standby position.

With the valve 10 in the standby condition, the occluder 50 is spaced from the stop surface 30 and incoming water is able to flow from the inlet 14 through the flow path 68 of the occluder 50 to the domestic supply portion 34 of the interior chamber 22 to supply the domestic water systems. More specifically, the preferred annular ring 64 at the distal end 62 of the occluder 50 is located at its maximum distal spacing from the stop surface 30 of the inner surface 20 of the valve 10. The sealer spring member 72 biases the occluder 50 against the shoulder 59 of the shaft portion 54. With the head portion 52 of the sealer 48 engaged with the sealing surface 28, the proximal end 60 of the occluder 50 is located substantially within the second interior passageway 40 of the valve 10 so as to minimize the obstruction in the domestic supply portion 34 of the valve and maximize the available flow out of the second outlet 18 to service the water demand of the domestic systems. Incoming water flows from the inlet 14 through the flow path 68 of the occluder 50 to the domestic supply portion 34 of the interior chamber 22 to supply the domestic water systems. Accordingly, the flow controller 42 in its preferred standby condition defines a sealed-off flow path between the inlet 14 and first outlet 16 and a preferred maximum flow path between the inlet 14 and second outlet 18.

In preferred tripped and operating conditions, the flow controller 42 preferably provides a variable operating flow path between the inlet 14 and the first outlet 16. In addition, the flow controller 42 in its tripped and operating conditions preferably defines a minimum non-zero flow path between the inlet 14 and the second outlet 18. Shown in FIG. 2 is the valve 10 in the tripped condition. The valve 10 "trips" when the differential pressure between the portions of the interior chamber above and below the sealing surface 28 is too great to maintain the head portion 52 of the sealer 48 seated against the sealing surface. For example, should an automatic sprinkler of the fire protection system actuate, fluid pressure in the network of pipes will decrease so as to increase the differential pressure between the fire protection supply portion 36 and the supply portion 32 of the interior chamber 22. Once the differential pressure reaches a threshold, preferably about two to three pounds per square inch (2-3 psi.), the flow controller 42 will translate axially in the proximal direction so as to unseat the head portion 52 of the sealer 48 from the sealing surface 28. Under the tripped condition, the axial translation of the flow controller 42 in the proximal direction proximally translates the occluder 50 proximally until the annular ring 64 at the distal end 62 of the occluder engages the stop surface 30. The sealer spring member biases the proximal end 60 of the occluder against the shoulder 59 of the shaft portion 54 of the sealer 48. Accordingly, in the tripped condition, the proximal end 60 of the occluder 50 is preferably located in the first interior passageway 38 at a minimum distance from the sealing surface 28 such that the wall 66 of the occluder 50 substantially occludes transaxial/circumferential flow in the domestic supply portion 34 of the interior chamber 22. However, due to the gap width between the external surface of the wall 66 of the occluder 50 and the inner surface 20 defining the first interior passageway 38, water from the inlet 14 flowing along the flow path 68 of the occluder 50 and out the openings at the proximate end 60 of the occluder can flow back downward into the domestic supply portion 34 of the interior chamber 22 so as to provide a minimal flow of fluid to the second outlet 18. The minimal amount of fluid flow to the second outlet 18 is preferably an amount sufficient enough to allow the fluid pressure to equalize at each of the inlet 14 and outlets 16, 18 once the valve is isolated from the fluid source. The amount of fluid flow to the second outlet 18 after the valve 10 has been tripped can be defined by the gap width between the external wall 66 of the occluder 50 and the inner surface of the first interior passageway 38. Accordingly, the preferred fluid control valve provides at least for a minimal fluid flow to the second outlet 18 even in the tripped and operated conditions. The majority of the fluid flow is diverted past the sealing surface 28, about the head portion 52 of the sealer 48 and into the fire protection supply portion 36 of the interior chamber for fluid service to the fire protection system from the first outlet 16. Alternatively or in addition to providing the radial gap between the flow controller 42 and the inner surfaces of the interior passageways 38, 40, the occluder 50 could include one or more openings in its sidewall 60 sized to provide the desired minimum fluid flow to the domestic portion and second outlet 18 when the valve is in the tripped condition. Further in the alternative, the flow controller 42 can be configured so as to completely seal off fluid flow to the second outlet 18 and the domestic portion upon a tripped or operated condition of the valve 10. For example, the occluder 50 can be configured to engage the inner surfaces of the interior passageways 38, 40 so as to completely seal off fluid flow to the second outlet 18 and the domestic portion upon a tripped or operated condition of the valve 10.

As previously noted, the flow controller 42 of the preferred valve 10 provides for an increased flow in response to increased demand requirements of a system that is serviced by the valve 10. For example, where additional automatic sprinklers are actuated and water demand is increased for the fire protection system, the flow controller 42 responds to increase the fluid flow to the first outlet 16. Referring to FIG. 3, the preferred valve assembly provides an operated condition in which increased fluid demand from the first outlet 16 increases the differential pressure between the fire protection supply portion and the supply portion of the water. Increased fluid pressure on the underside of the head portion 52 of the sealer 48 and decreased fluid pressure on the top side of the head portion 52 causes further translation of the sealer 48 in the proximal axial direction so as to compress the preferred downstream spring member 78. Due to the occluder 50 engagement with the stop surface 30, the sealer 48 translates relative to the occluder 50 such that the occluder 50 is located at its most distal position along the shaft portion 54 of the sealer. The continued axial translation of the sealer 48 results in the occluder 50 and shaft portion 54 translating relative to one another so as to locate the occluder 50 in its most distal position along the shaft portion 54. With the occluder 50 in its most distal position, the sealer spring member 72 is compressed to its final compression length, preferably about one inch and more preferably about 0.75 inch. Depending on the number of sprinklers open and the operating flow requirements of the each open sprinkler, the location of the sealer 48 relative to the sealing surface 28 will preferably vary accordingly. In FIG. 2, the sealer 48 is shown in the tripped condition, and in FIG. 3, the sealer 48 is shown at its maximum distal position. The sealer spring member 72 compression length correspondingly varies in response to the actual fluid demand at the first outlet 16. Thus, the preferred valve 10 provides for varied fluid flow at the first outlet 16 in response to the demand at the first outlet 16 by varying the distance between the seal surface 57 of the sealer 48 and the sealing surface 28. Accordingly, the valve 10 preferably defines i) an operating flow path between the inlet 14 and the first outlet 16 and ii) a standby flow path between the inlet 14 and second outlet 18, in which the flow controller 42 partially obstructs the operating and standby flow paths with a greater obstruction to the standby flow path than to the operating flow path upon actuation or operation of the valve 10. Moreover, in one preferred operation of the valve 10 when provided with a water flow rate of 150 gpm out of the first outlet 16, the valve preferably has a head loss or differential pressure between the inlet 14 and first outlet 16 of no more than three pounds per square inch (3 psi.). Once the valve 10 is tripped, the head portion 52 is spaced from the sealing surface 28 to preferably provide a fluid flow to a most hydraulically remote sprinkler coupled to the valve 10 ranging from at least about five to eight gallons per minute (5 gpm-8 gpm) for a standard residential water pressure supplied at the inlet 14.

Following the trip and operation of the valve 10, the valve 10 can be reset to its standby condition by returning the sealer 48 to the seated condition against the sealing surface 28 of the valve 10. Resetting of the flow controller 42 to its seated position can be performed by following the Valve Setting Procedure outlined in Tyco Fire Suppression & Building Products Data Sheet TFP980 (May 2007) entitled, "Model RSV-1 Residential Domestic Shutoff Valve 1 Inch (DN25) For Dual Purpose Residential Water Supply" and/or those outlined in U.S. Pat. No. 6,357,467.

With reference to FIG. 1A, the following steps are preferably performed to reset the dual-purpose fluid control valve 10 when initially filling the pipes of the installation or following a fire sprinkler operation:

1. Close the main control valve 306.
2. Close the domestic control valve 312 and all water outlets in the domestic piping system.
3. Close all drain valves in addition to the drain and flow test connection 318 in the fire protection sprinkler piping system, and replace all operated sprinklers 322 as necessary. The radial gap widths between the outer surface of the flow controller 42 and the inner surfaces of the first and second interior passageways allow for the flow controller 42 to return to its seated condition by facilitating rapid equalization of fluid pressure at the inlet 14 and the first and second outlets 16, 18 once the valve 10 has been isolated.
4. Partially open the main control valve 306 until the sound of flowing water just begins, and then leave the main control valve 112 in the partially open position.
5. After the fire protection sprinkler piping system pressure gauge 320 indicates approximately the same pressure as the supply pressure gauge 310, fully open the main control valve 306.
6. Open the inspector's test connection preferably located adjacent the most hydraulically remote sprinkler 322. After trapped air has been relieved, close the inspector's test connection.
7. Open the highest elevation outlet on the domestic piping system.
8. Partially open the domestic control valve 312 until the sound of flowing water begins, and allow the domestic piping system to slowly fill with water.
9. Close the highest elevation water outlet on the domestic piping system when unaerated water begins to flow.
10. Completely open the domestic control valve 312, and then check that the domestic piping system is properly pressurized by verifying that at least three water outlets in the domestic piping system can flow full at the same time.

With the domestic water outlets flowing full, the shutoff valve 10 is set and ready for service, and the water outlets on the domestic piping system may be closed.

Figure 4:
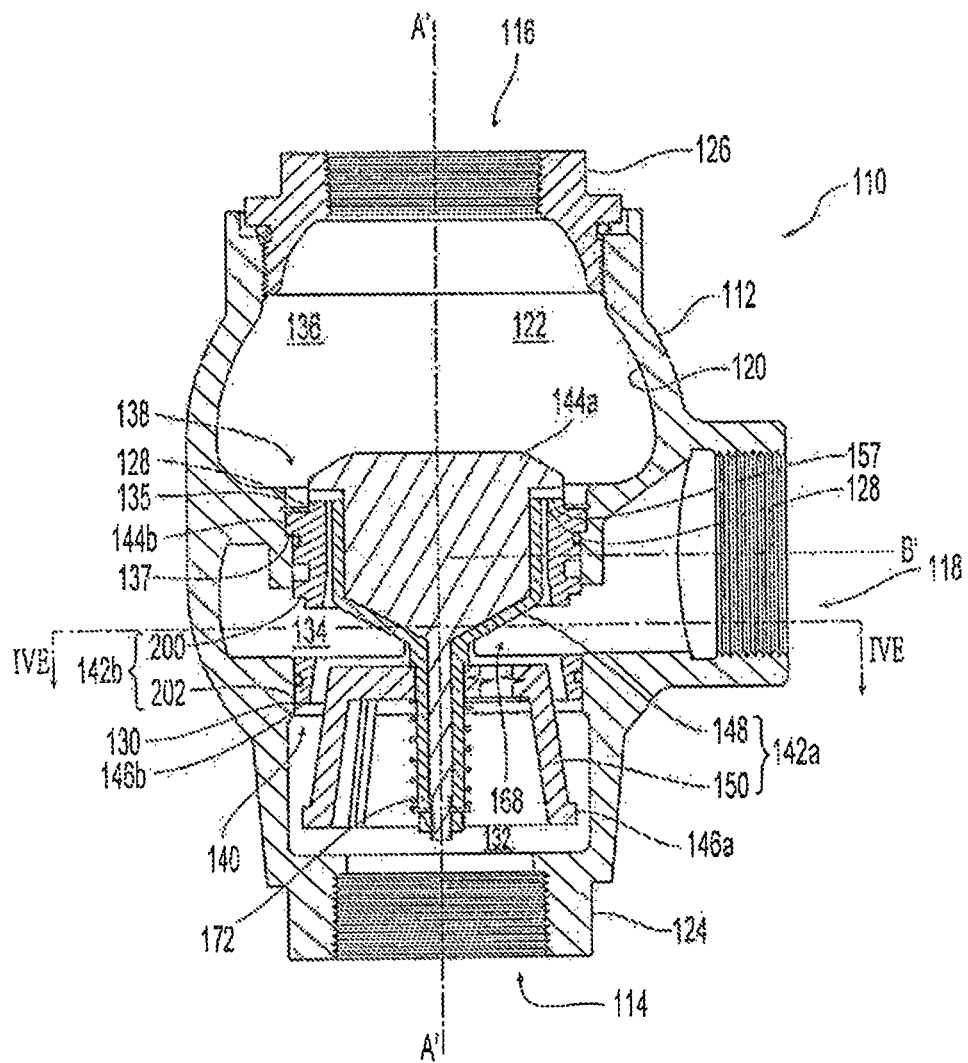
FIG. 4 is a cross-sectional view of a second embodiment of a preferred fluid control valve in a standby condition.
Figure 5:
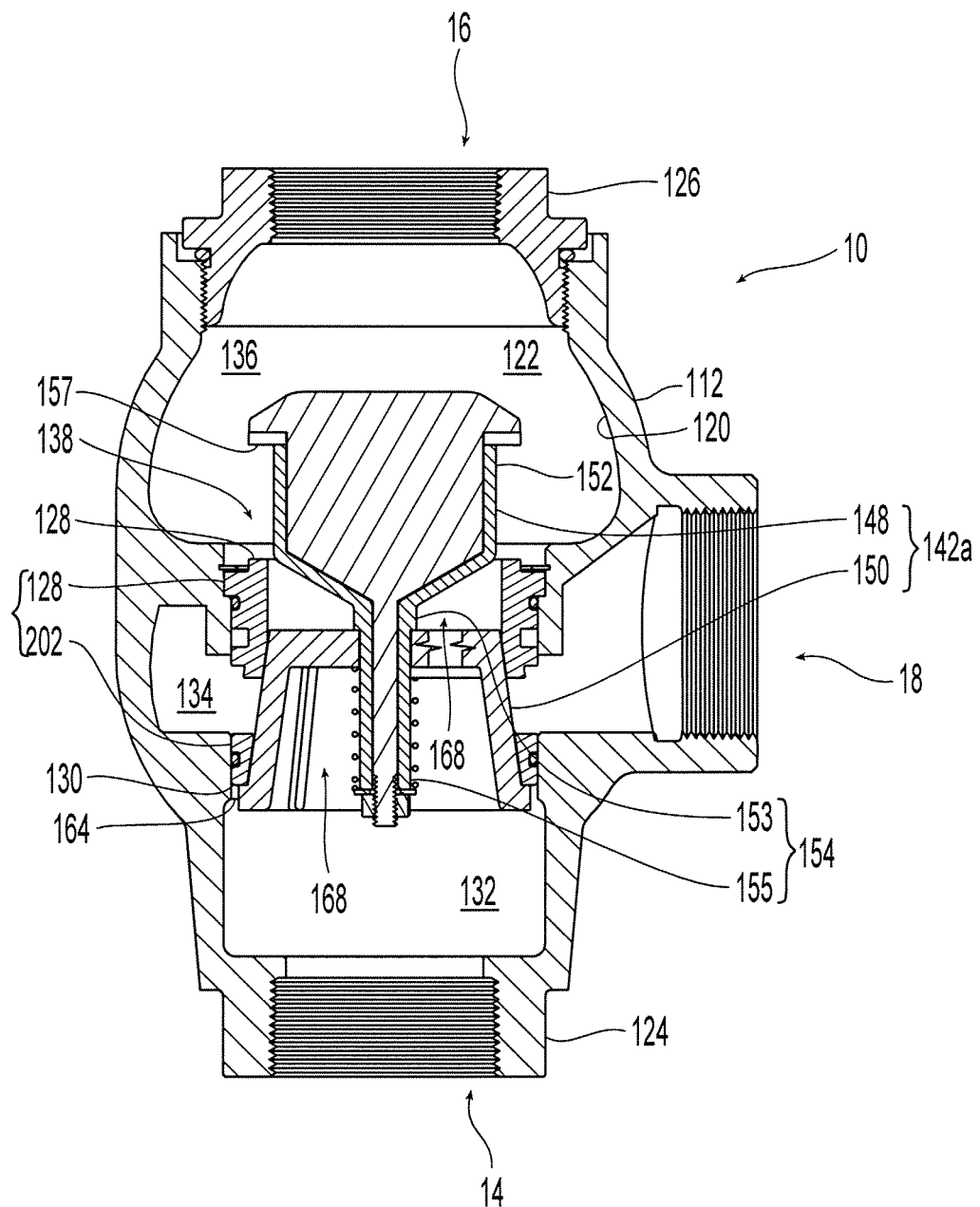
FIG. 5 is a cross-sectional view the fluid control valve of FIG. 4 in a tripped condition.
Figure 6:
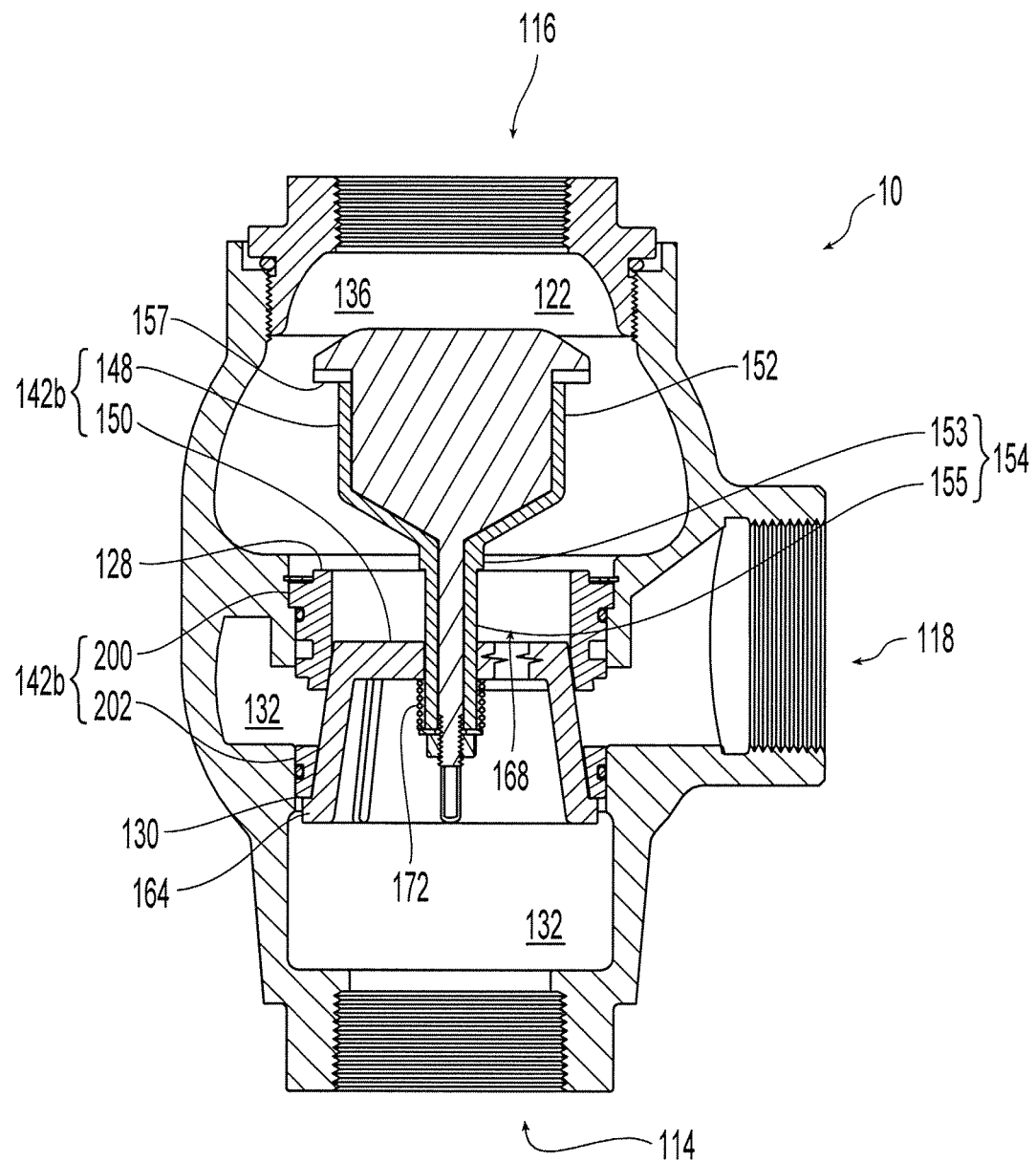
FIG. 6 is a cross-sectional view of the fluid control valve of FIG. 4 in a fully operated condition.

Shown in FIGS. 4, 5 and 6, is another preferred embodiment of the dual-purpose fluid control valve 110. The alternate valve 110 provides for a preferred two inch residential shut-off valve without the need for a downstream spring member supported by an inlet insert. Referring to FIG. 4, a dual-purpose fluid control valve 110 includes a main body 112 having at least three ports, for example, an inlet 114 for connection to a fluid supply line and a first and a second outlet 116, 118 for service of two separate and substantially isolated fluid systems.

Referring specifically to FIG. 4, the inner surface 120 of the body 112 forms an interior chamber 122 that preferably defines the central longitudinal axis A'-A' of the valve 110. The interior chamber 122 is placed in communication with each of the inlet 114 and outlets 116, 118. Preferably, the inlet 114 and the first outlet 116 are centered and axially spaced apart along the axis A'-A' with the inlet 114 located at the distal end 124 of the body 112 and the first outlet 116 at the proximal end 126 of the body 112. The second outlet 118 is preferably located between the inlet 114 and the outlet 116. More preferably, the second outlet 118 is centered along an axis that is perpendicular to the longitudinal axis A'-A' between the inlet 114 and first outlet 116. Alternatively, the inlet 114 and outlets 116, 118 can be off axis relative to one another and/or disposed on axes skewed with respect to the longitudinal axis of the valve 110.

The inner surface 120 of the body 112 further preferably divides the interior chamber 122 into portions of preferably fixed or constant volumes. More specifically, the inner surface 120 preferably divides the interior chamber 122 into three portions: a supply chamber portion 132 that is in direct communication with the inlet 114; a domestic supply chamber portion 134 in direct communication with the second outlet 118; and a fire protection supply chamber portion 136 in direct connection with the first outlet 11.6, The inner surface 120 further preferably defines a first interior passageway 138 and a second interior passageway 140 Which are spaced apart and centrally axially aligned along the central axis A-A, Each of the first and second interior passageways 138, 140 have a proximal end and a distal end spaced from the proximal end. The first interior passageway 138 has an axial length that is preferably longer than the second interior passageway 140.

Disposed within the interior chamber 122 of the valve 110 is means for controlling a rate of fluid through one chamber of the valve 110, for example, the means can control the rate of fluid flow through the fire protection portion 136 based on a fluid demand at the first outlet 116 while controlling the rate of fluid flow to the second outlet 118. More specifically, the valve 110 preferably includes a flow controller assembly 142 for controlling the flow of water between the inlet and supply portion 114, 132 of the valve 110 and the domestic and fire protection portions 134, 136 of the valve 110. The flow controller assembly 142 has a movable component 142a having a proximal end 144a and a distal end 146a. The flow controller assembly 142 further has a stationary component 142b having a proximal end 144b and a distal end 146b. The stationary component 142b of the flow controller is preferably an insert substantially fixed within the first and second interior passageways 138, 140. The movable component 142a is preferably centrally disposed within the stationary component 142b, and in order to control and more preferably regulate the flow of water in the valve 110, the movable component 142a translates axially along the axis A'-A' so as to alternately i) prevent fluid flow from the inlet 114 to the first outlet 116 and supply fluid flow to the second outlet 118; and ii) significantly reduce fluid flow to the second outlet 118 and divert the majority of the fluid flow to the first outlet 116. Preferably, the movable component 142a of the flow controller assembly 142 translates such that its proximal and distal ends 144a, 146a correspondingly and alternately engage the sealing surface 128 and the stop surface 130 formed respectively at the proximal and distal ends 144b, 146b of the stationary component 142b to provide the desired fluid control.

Figure 4A:
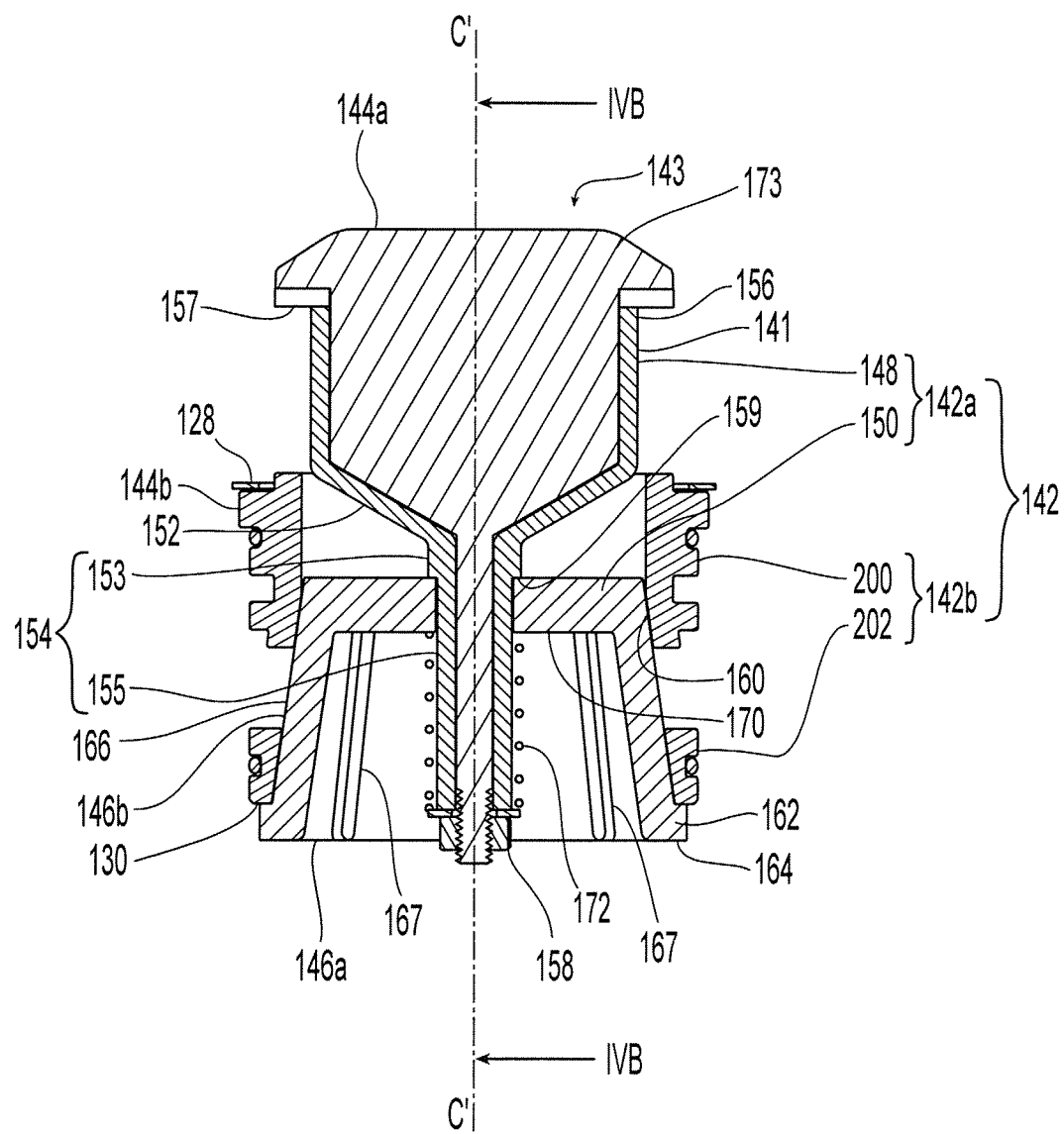
FIG. 4A is a detailed cross-sectional view of an occluder used in the valve of FIG. 4.
Figure 4B:
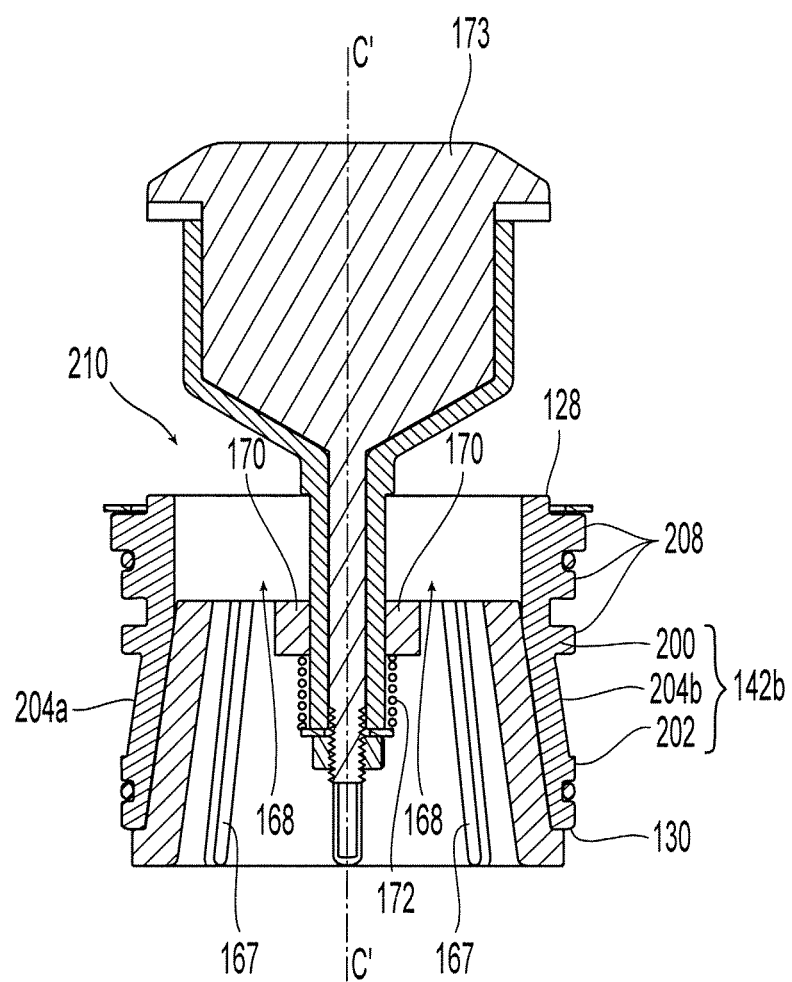
FIG. 4B is another detailed cross-sectional view of the occluder used in the valve of FIG. 4 along line IVB-IVB in FIG. 4A.

The movable component 142a of the flow controller assembly 142 preferably includes two subcomponents that can translate with respect to one another along the axis A'-A' between the fire protection and domestic chamber portions 134, 136 of the valve 110. The first subcomponent is a sealer 148 and the second subcomponent is an occluder 150. Referring to FIGS. 4A and 4B, is a detailed view of the flow controller assembly 142. The sealer 148 preferably includes a wider head portion 152 and a narrower shaft portion 154 depending from the head portion 152 and extending along a central axis C'-C'. The sealer 148 has a proximal end 156 and a distal end 158 with a wall 141 circumscribed about the central axis C'-C' to define a central bore 143. The geometry of the head portion 152 preferably converges toward the central axis C'-C' to transition to the shaft portion 154 to define a preferably substantial frustrum geometry. The preferred sealer 148 also has disposed and secured within the central bore 143 a weight member 173 that is preferably disposed and secured within the central bore 143 at the distal end 158 of the wall 141. The weight member 173 is preferably configured to fit the internal geometry of the wail 141. The widest portion of the weight member 173 further preferably includes a gasket or seal surface 157 for mating with a sealing surface 128 of the stationary component 142b of the fluid controller 142 to form a fluid tight seal with the remainder of the sealer 148 extending through the first and second interior passageways 138, 140 along the axis A'-A' of the valve. The preferred seal surface 157 is preferably a separate seal element of EPDM material per ASTM D2000.

Figure 4C:
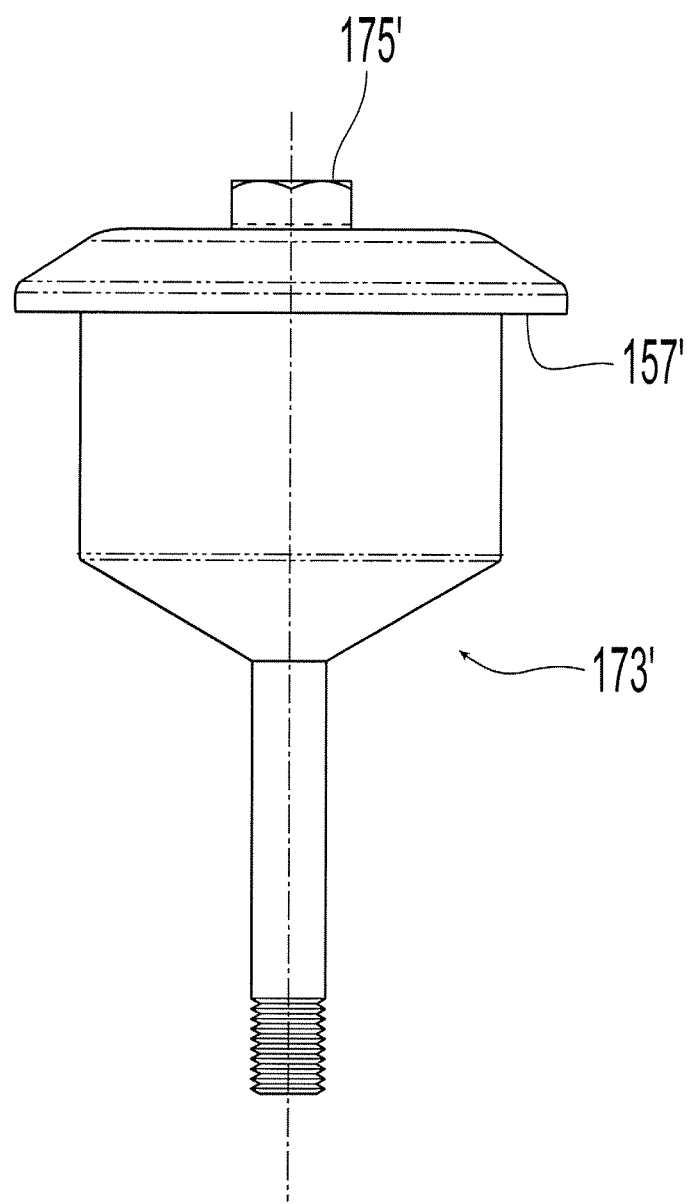
FIG. 4C is another embodiment of a weight member for use in the valve of FIG. 4.

Shown in FIG. 4C is a preferred embodiment of a weight member 173'. Atop the widest portion of the weight member 173' at its proximal end is a multi-faceted tool engagement surface 175'. The surface 175' provides a surface for engagement with an assembly tool, such as for example, a wrench to secure the weight member 173' within the central bore 143 of the wall 141. The tool engagement surface 175' preferably includes six facets disposed about the central longitudinal axis of the weight member 173'.

Referring again to FIGS. 4A and 4B, the shaft portion 154 preferably includes a proximal shaft portion 153 and a thinner distal shaft portion 155 with a transition therebetween defining an annular shoulder 159. Disposed about the shaft portion 154 and more preferably disposed about the distal shaft portion 155 is the occluder 150. The occluder 150 includes a proximal end 160, a distal end 162 and an annular wall 166 to preferably define a substantially cylindrical member. More preferably, the occluder defines a frustrum in which the widest portion of the occluder 150 is preferably located at the distal end 162 for engagement with a stop surface 130 or other surface projection of the stationary component 142b to limit translation of the occluder 150 relative to the stationary component 142b. More specifically, the distal end 162 of the occluder 150 includes an annular ring 164 shaped to mate with the stop surface 130. Referring specifically to FIG. 4B, the annular wall 166 preferably circumscribes the central axis C'-C' with open ends at the proximal and distal ends 160, 162 to define a flow path 168 through which fluid can flow. The wall 166 of the occluder 150 is preferably reinforced by radially spaced rib members 167. The opening at the proximal end 160 is preferably defined by a frame that includes a strut member 170 that preferably bisects the opening at the proximal end 160. The strut member 170 includes a central bore in which the distal shaft portion 155 is disposed. The central bore of the strut member 170 is preferably sized so that the occluder 150 can translate over the distal shaft portion 155.

Figure 7:
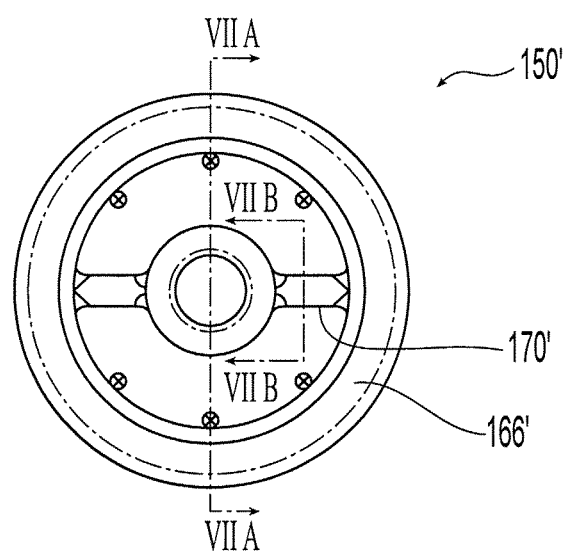
FIGS. 7, 7A and 7B are plan, cross-sectional and detailed views of another embodiment of an occluder for use in an embodiment of the fluid control valve.
Figure 7A:
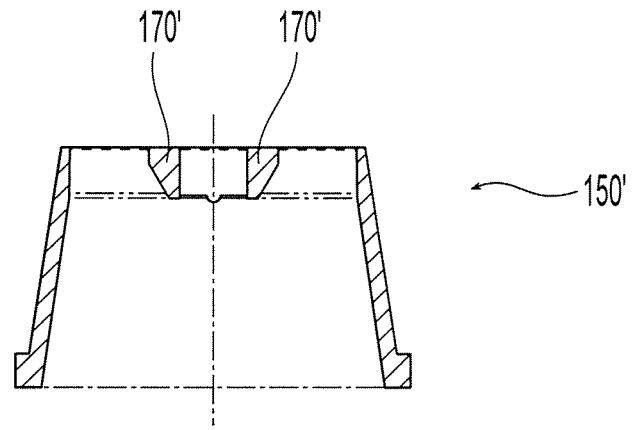
Figure 7B:
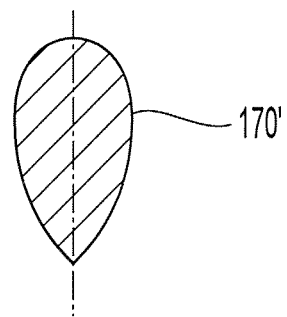

Shown in FIGS. 7, 7A and 7B is an alternate preferred embodiment of the occluder 150'. The alternate occluder 150' includes a strut member 170' with a portion defining a central bore for housing the distal shaft portion of the sealer 148. In this embodiment, the strut member 170 preferably tapers or narrows in its width in the proximal-to-distal direction. With reference to FIG. 7A, the outer surface of the strut member 170' relative to its central bore preferably includes an angled surface which angles towards the central axis of the occluder 150'. Shown in FIG. 7B is a cross-sectional view of the strut member 170' taken along a straight portion of the strut member 170' between the wall 166' and the central bore. The strut member 170' preferably defines a tear drop geometry that tapers narrowly in the proximal-to-distal direction. The tear drop geometry provides desired flow characteristics through the occluder 150' as the flow flows around the strut members 170' and the sealer 148. Moreover, the preferred cross-sectional geometry provides the strength in the strut member 170' under the fluid load, which may be desired where the occluder is made from a thermoplastic material such as, for example, Noryl GFN2. The cross-sectional geometry of the strut member 170' remains preferably constant between the central bore defining portion and the wall 166'.

Figure 8:
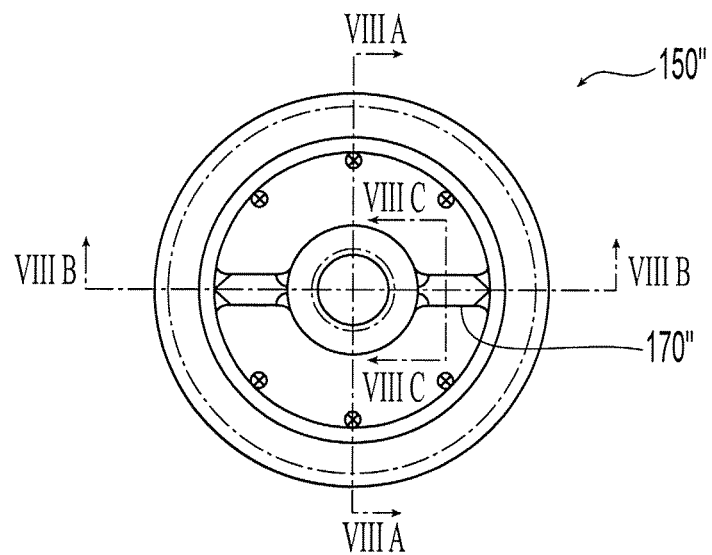
FIGS. 8, 8A, 8B and 8C are plan, cross-sectional and detailed views of another embodiment of an occluder for use in an embodiment of the fluid control valve.
Figure 8A:
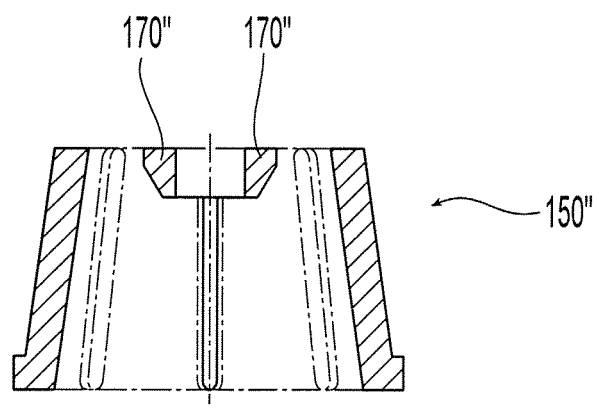
Figure 8B:
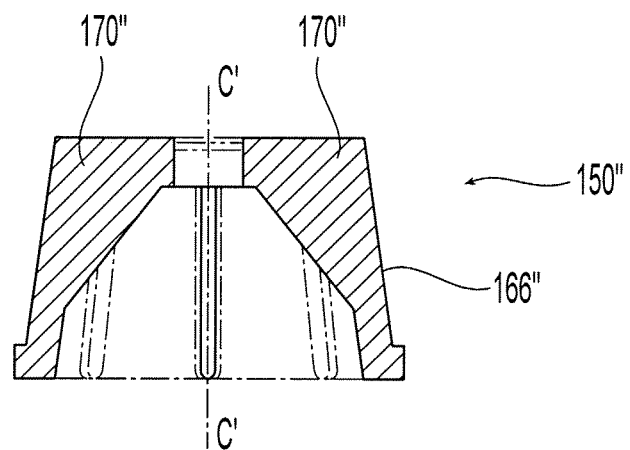
Figure 8C:
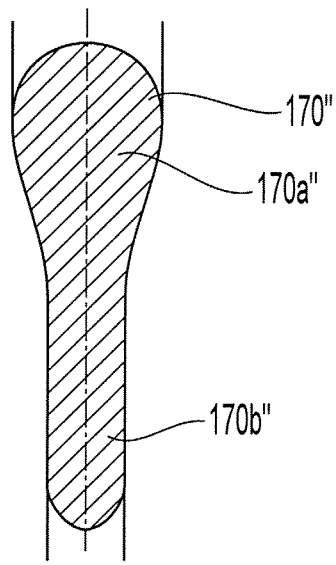

Shown in FIGS. 8, 8A, 8B and 8C is another alternate preferred embodiment of the occluder 150". The alternate occluder 150" also includes a strut member 170" with a portion defining a central bore for housing a distal shaft portion of the sealer 148. The strut member 170" also preferably tapers or narrows in its width in the proximal-to-distal direction. With reference to FIG. 8A, the outer surface of the strut member 170" relative to its central bore preferably includes an angled surface which angles towards the central axis of the occluder 150". Shown in FIG. 8C is a cross-sectional view of the strut member 170" taken along a straight portion of the strut member 170' between the wall 166' and the central bore. The strut member 170" preferably defines an elongated tear drop geometry with a wider proximal portion 170a" that tapers narrowly in the proximal-to-distal direction to an elongated distal portion 170b" of a preferably constant width. The elongated geometry provides desired flow characteristics through the occluder 150" as the flow flows around the strut members 170" and the sealer 148. Moreover, the preferred cross-sectional geometry provides the strength in the strut member 170" under the fluid load, which may be desired where the occluder is made from a thermoplastic material such as, for example, Noryl GFN2. The cross-sectional geometry of the strut member 170" preferably varies at a constant rate between the central bore defining portion and the wall 166'. Shown with specific reference to FIG. 8B, the strut member 170" becomes thicker in the proximal-to-distal direction as the strut member 170" extends radially from the central bore to the wall 166" of the occluder.

Figure 4D:
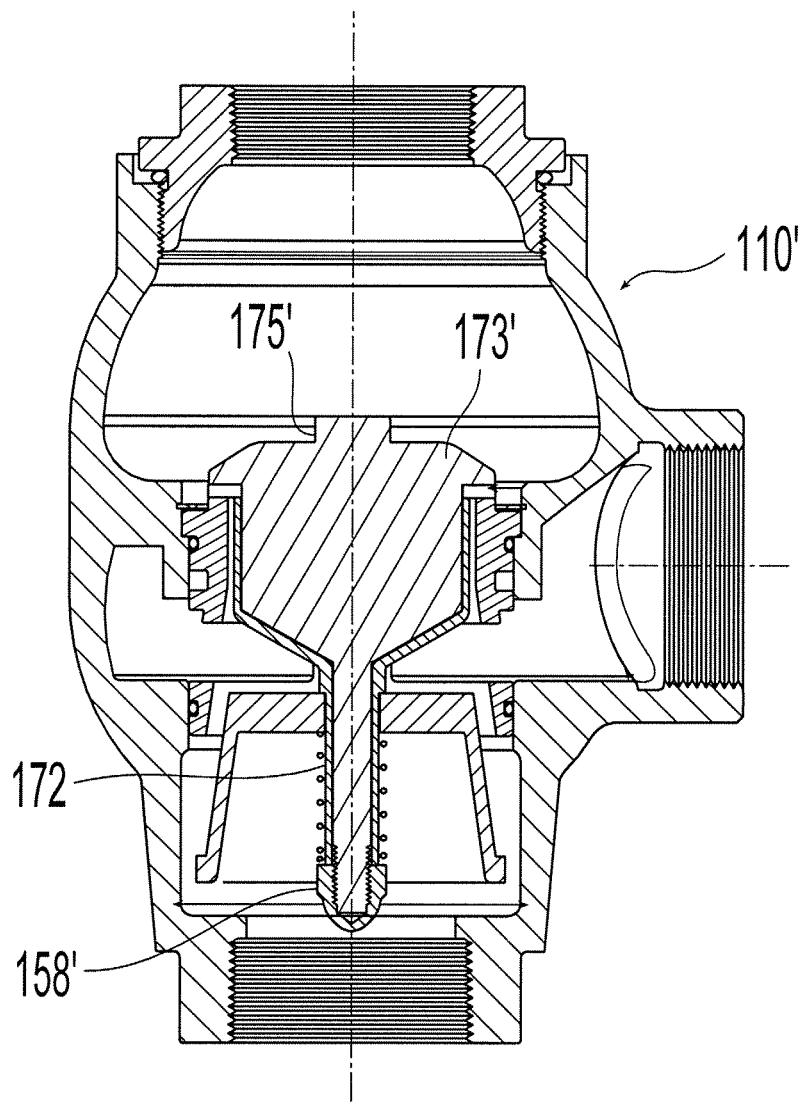
FIG. 4D is a cross-sectional view of another embodiment of the valve of FIG. 4 using the weight member of FIG. 4C.

Referring again to FIGS. 4A and 4B, preferably disposed about and coupled to the distal end of the shaft portion 155 is a sealer spring member 172. The sealer spring 172 biases the occluder 150 against the shoulder 159 of the shaft portion 154 so that in the standby condition, the sealer locates the occluder 50 distally to maximize fluid flow to the second outlet 118. The preferred controlling means of the valve 10 regulates the flow of fluid out of the outlets of the valve in response to a change in demand for fluid from one of the systems supplied by the valve 110. Upon actuation of the valve 110, the flow controller 142 regulates the flow of fluid to the first outlet 116 in response to, for example, an open sprinkler in a fire protection system. The sealer spring 172 provides, in response to increased fluid demand at the outlet 116, a resilient axial translation of the occluder 150 about the shaft portion 154. Axial translation of the occluder 150 from its initial proximal position at the shoulder 159 to the most distal position compresses the sealer spring 172 from an initial spring length to its most compressed length as shown in FIG. 4B. The proximal end of the sealer spring 172 preferably engages the strut member 170 of the occluder 150 and the distal end of the sealer spring 172 preferably engages a washer 174 secured to the distal end of the shaft portion 154 by a set screw 158. Shown in FIG. 4D is another preferred valve assembly 110' with the preferred weight member 173'. In the alternate assembly, the sealer spring 172 is preferably supported by an end cap 158,' and more preferably an "acorn nut" threaded end cap threaded about the distal end of the shaft portion 155 of the weight member 173'. The threaded end cap 158' preferably includes a multi-faceted flange to support the sealer spring 172 thereby eliminating the need for a separate washer to engage and support the sealer spring 172. The multi-faceted surface 175' at the proximal end of the weight member 173' provides a means for holding the weight member 173' steady for securing the set screw 158 or end cap 158' to the distal end of the shaft portion 154 of the sealer 148.

The sealer spring 172 has a preferred free length of 1.5 inches with a spring rate ranging from about 5 to about 10 pound-force per inch (lbs./in.) with about seven coils to provide for an approximate load ranging from about six to about ten pounds at its solid height. Preferably, the sealer spring has a spring rate of about 8.3 lbs./in. with 7.2 coils to provide for an approximate load at its solid height of about 10 lbs. More preferably, the sealer spring 172 has a preferred spring rate of about 5.4 lbs./in. with 7.5 coils to provide for an approximate load at its solid height of about 6.1 lbs. The preferred sealer spring 172 is constructed from 0.049 inch diameter stainless steel wire passivated per ASTM A967. The preferred sealer spring 172 is provided by Lee Spring Co. identified by Part #LC 049H 06 S; #LC 045H 06 S or an equivalent thereof. The sealer spring 172 resiliently positions the sealer 148 and occluder 150 relative to one another so that upon actuation of the valve 110, the flow controller assembly 142 regulates the flow of fluid to the first outlet 116 in response to fluid demand from, for example, the fire protection system.

The stationary component 142b of the flow controller assembly 142 preferably includes a first proximal annular member 200 and a second distal annular member 202. The first and second annular members 200, 202 are centrally axially aligned along the axis C'-C' and are preferably spaced apart and affixed to one another by a pair of diametrically opposed ribbings 204a, 204b. The annular members 200, 202 and ribbing 204a, 204b are preferably formed such that the stationary component 142b is of a single unitary construction. Each of the first and second annular members 200, 202 have a proximal end and a distal end to define an orifice in which a sealing surface 128 is preferably located at the proximal end of the first annular member 200 and the stop surface 130 is preferably located at the distal end of the second annular member 202.

With specific reference to FIG. 4B, the outer surface of each of the first and second annular member 200, 202 preferably includes one or more axially spaced rings 208 for housing gasket seals and engaging the interior surface of the first and second passageways 138, 140 of the valve body 112. The annular members 200, 202 and ribbings 204a, 204b together form an internal passage 210 for receipt of the movable component 142a of the flow controller assembly 142. Preferably, the internal passage 210 of the stationary component defines a decreasing cross-sectional area in the distal-to-proximal direction. The interior surfaces of each of the first and second annular members 200, 202 are preferably dimensioned such that the head portion 152 of the sealer 148 is radially spaced from the inner or mating surface of the first annular member 200, and the outer surface of the wall 166 is radially spaced from the inner or mating surface of the second annular member 202. The interior surfaces of the first and second annular members 200, 202 are preferably substantially parallel to the external surfaces of each of the peripheral surfaces of the head portion 152 and occluder 150. In a preferred assembly of the flow controller assembly 142, the peripheral surface of the head portion 152 defines a minimum radial gap width of about 0.065 inches from the inner surface of the first annular ring member 200, and the peripheral surface of the occluder 150 defines a minimum radial gap width of about 0.005 inches from the interior surface of the second annular member 202. Given the preferred geometry of the head portion 152, the gap width between the head portion 152 and the inner surface of the first annular member 200 preferably increases as the movable component 142a of the flow controller assembly 142 axially translates in the proximal direction.

Figure 4E:
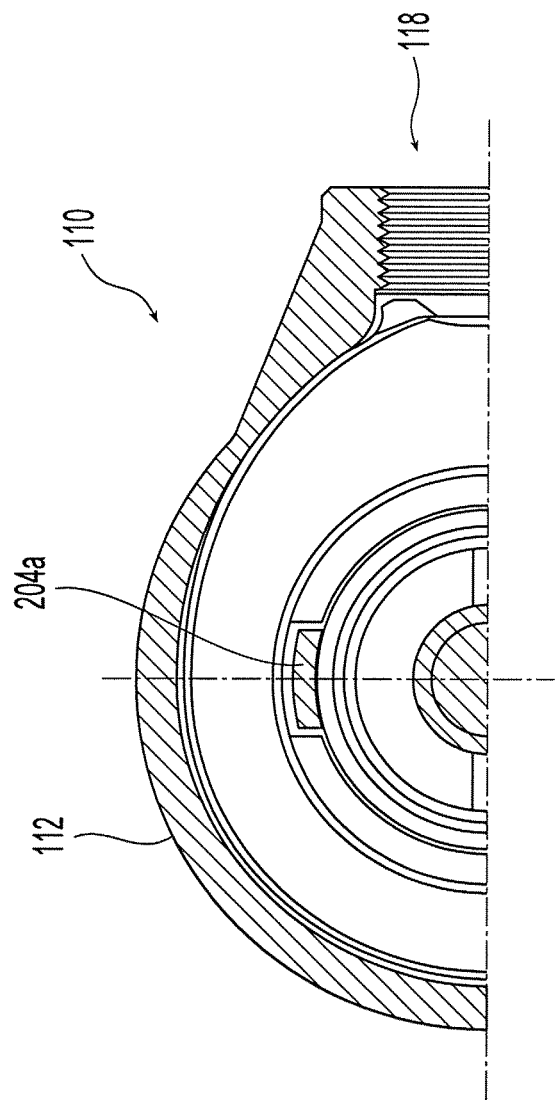
FIG. 4E is a cross-sectional view of the valve of FIG. 4 along line IVE-IVE.

Referring again to FIG. 4, the flow controller assembly 142 is installed within the interior chamber 122 of the valve body 112 with the first and second annular members 200, 202 of the stationary member 142b respectively fixed within the first and second interior passageways 138, 140. In order to maximize the flow through the stationary member 142b to the second outlet 118, the ribbings 204a, 204b are preferably located orthogonally to the axis of the second outlet 118, as shown for example, in FIG. 4E. To locate and secure the stationary component 142b within the interior chamber 122, the inner surface 120 of the valve body 112 defining the first passageway 138 preferably includes a support ledge 137 for supporting one of the peripheral surface rings 208 of the first annular member 200 of the stationary component and a retainer ring 135 secures the surface ring 208 against the ledge 137. Moreover, to facilitate the desired orientation of the ribbings 204a, 204b relative to the second outlet 118, one of the peripheral surface rings 208 preferably includes a narrow axially extending ridge bump (not shown) that engages a correspondingly dimensioned groove (not shown) along the inner surface of the valve which defines one of the passageways, for example, the first passageway 138. With the ridge of the stationary component 142b located within the groove, the ribbings 204a, 204b are disposed in the desired location relative to the second outlet 118.

In the preferred valve installation as a dual-purpose residential shut-off valve, the shut off valve 110 is installed in a vertical riser assembly such that gravity acts in the distal direction to bias the sealer 148 against the seal surface 128. The weight member 173 preferably ranges is weight from about 0.6 to about 0.8 lbs, and under its own weight, the weight member 173 acts to bias the sealer 148 in the axial direction against the sealing surface 128. A feed pipe from the domestic water supply is preferably threaded into the valve inlet 114, which is preferably nominally sized for receipt of a two inch feed pipe. A main feed line of a residential sprinkler system is coupled to the first outlet 16 of the valve 110. Preferably threaded into the first outlet 116 is a threaded outlet insert 182 for connection to the nominal two inch feed pipe. The second outlet 118 is preferably coupled to a domestic supply feed line for the domestic water system.

With the preferred fluid control valve 110 installed, the valve 110 preferably has a sealed condition and an unsealed condition, and more preferably: i) a standby sealed condition and ii) an unsealed condition with an initial tripped condition and a fully open operated condition, depending on the hydraulic demands of the systems to which the valve 110 is connected. The fluid control valve has a standby condition in which the valve 110 obstructs or seals off water flow from the inlet 114 to the first outlet 116 and substantially all the fluid flow is directed to the domestic supply portion 134 and the second outlet 118 for water supply to domestic systems.

FIG. 4 shows the internals of the valve 110 when the valve is in the standby condition. In the standby condition, the flow controller assembly 142 is in its most distal position with the seal surface 157 of the head portion 152 of the movable component 142a is fully engaged with the sealing surface 128 of the stationary component 142b to seal off or obstruct fluid flow to the first outlet 116. Accordingly, the preferred fluid control valve 110, like the prior embodiment, provides for a single fixed seal surface 128 that is engaged by a movable seal 137 to prevent or obstruct flow to at least one outlet of the riser. The remainder of the head portion 52 of the sealer 148 is substantially housed within the first annular member 200. The movable component 142a of the flow controller assembly 142 is held down against the sealing surface 128 and the fluid pressure from the incoming fluid supply distal of or below the sealing surface 128. In addition to the downward bias provided by the weight member 173, the head portion 152 of the sealer 148 is held downward against the sealing surface 128 by the static fluid pressure proximal to or above the head portion 152. The fluid pressure of the fire protection sprinkler system coupled to the first outlet 116 provides the static pressure to hold the flow controller assembly 142 in its sealed position against the sealing surface 128.

With the valve 110 in the standby condition, the occluder 150 is spaced from the stop surface 130 of the stationary component 142b and incoming water is able to flow from the inlet 114 through the flow path 168 of the occluder 150 to the domestic supply portion 134 of the interior chamber 122 to supply the domestic water systems. More specifically, the preferred annular ring 164 at the distal end 162 of the occluder 150 is located at its maximum distal spacing from the stop surface 130 of the insert or stationary component 142b of the flow controller.

In the movable component 142a, the sealer spring member 172 biases the occluder 150 against the shoulder 159 of the shaft portion 154 of the sealer 148. With the head portion 152 of the sealer 148 engaged with the sealing surface 128, the proximal end 160 of the occluder 150 is surrounded by the second annular member 202 of the stationary component so as to minimize the obstruction in the domestic supply portion 134 of the valve and maximize the available flow out of the second outlet 118 to the service the water demand of the domestic systems. Incoming water flows from the inlet 114 through the flow path 168 of the occluder 150 to the domestic supply portion 134 of the interior chamber 122 to supply the domestic water systems. Accordingly, the flow controller 142 in its preferred standby condition defines a sealed-off flow path between the inlet 114 and first outlet 116 and a preferred maximum flow path between the inlet 114 and second outlet 118. In a preferred operating condition, the flow controller 142 preferably provides a variable operating flow path between the inlet 114 and the first outlet 116. In addition, the flow controller 142 in its operating condition preferably defines a minimum non-zero flow path between the inlet 114 and the second outlet 118. Alternatively in its operating condition, the flow controller can be configured to completely seal off flow to the second outlet 118.

In preferred tripped and operating conditions, the flow controller assembly 142 preferably provides a variable operating flow path between the inlet 114 and the first outlet 116. In addition, the flow controller assembly 142, in its tripped and operating conditions, preferably defines a minimum non-zero flow path between the inlet 14 and the second outlet 18. Shown in FIG. 5 is the valve 110 in the tripped condition. The valve 110 "trips" when the differential pressure between the portions of the interior chamber above and below the sealing surface 128 is too great to maintain the head portion 152 of the sealer 148 seated against the sealing surface 128. Once the differential pressure reaches threshold differential pressure, preferably about 3-5 psi., the movable component of the flow controller assembly 142a will translate axially in the proximal direction so as to unseat the head portion 152 of the sealer 148 from the sealing surface 128 of the stationary component 142b. Under the tripped condition, the axial translation of the flow controller assembly 142 in the proximal direction translates the occluder 150 proximally until the annular ring 164 at the distal end 162 of the occluder 150 engages the stop surface 130. The sealer spring member 172 biases the proximal end 160 of the occluder 150 against the shoulder 159 of the shaft portion 154 of the sealer 148. Accordingly, in the tripped condition, the proximal end 160 of the occluder 150 is preferably located within the first annular member 200 of the stationary component 142b at a minimum distance from the sealing surface 128 such that the wall 166 of the occluder 150 substantially occludes transaxial/circumferential flow in the domestic supply portion 134 of the interior chamber 122. However, due to the gap width between the external surface of the wall 166 of the occluder 150 and the inner or mating surface of the first annular member 200, water from the inlet 114 flowing along the flow path 168 of the occluder 150 and out the openings at the proximate end 160 of the occluder 150 can flow back downward into the domestic supply portion 134 of the interior chamber 122 so as to provide a minimal flow of fluid to the second outlet 118. The minimal amount of fluid flow to the second outlet 118 is preferably an amount sufficient enough to allow the fluid pressure to equalize at each of the inlet 114 and outlets 116, 118 once the valve is isolated from the fluid source. The amount of fluid flow to the second outlet 118 after the valve 110 has been tripped can be defined by the gap width between the external surface of the wall 166 of the occluder 150 and the inner or mating surface of the first annular member 200. The majority of the fluid flow is diverted past the sealing surface 128 about the head portion 152 of the sealer 148 and into the fire protection supply portion 136 of the interior chamber for fluid service to the fire protection system from the first outlet 116. Accordingly, the preferred fluid control valve provides at least for a minimal fluid flow to the second outlet 118 even in the tripped and operated conditions. Alternatively or in addition to providing the radial gap between the flow controller assembly 142 and the inner surfaces of the first and second annular members 200, 202, the occluder 150 could include one or more openings in its sidewall 160 sized to provide the desired minimum fluid flow to the domestic portion 138 and second outlet 118 when the valve is in the tripped condition. Further in the alternative, the controller 142 can be configured so as to completely seal off fluid flow to the second outlet 118 and the domestic portion upon a tripped or operated condition of the valve 110. For example, the occluder 150 can be configured to engage the inner surfaces of the first and second annular members 200, 202 so as to completely seal off fluid flow to the second outlet 118 and the domestic portion upon a tripped or operated condition of the valve 110.

The flow controller assembly 142 of the preferred valve 110 provides for an increased flow in response to increased demand requirements of a system that is serviced by the valve 110. For example, where additional automatic sprinklers are actuated and water demand is increased for the fire protection system, the flow controller assembly 142 responds to increase the fluid flow to the first outlet 116. Referring to FIG. 6, the preferred valve assembly provides an operated condition in which increased fluid demand from the first outlet 16 increases the differential pressure between the fire protection supply portion and the supply portion of the water. Increased fluid pressure on the underside of the head portion 152 of the sealer and decreased fluid pressure on the top side of the head portion 152 causes further translation of the sealer 148 in the proximal axial direction. Due to the occluder 150 engagement with the stop surface 130, the sealer 148 translates relative to the occluder 150 such that the occluder 150 is located at its most distal position along the shaft portion 154 of the sealer 148. The continued axial translation of the sealer 148 results in the occluder 150 and shaft portion 154 translating relative to one another so as to located the occluder 150 in its most distal portion along the shaft portion 154. With the occluder 150 in its most distal position, the sealer spring member 172 is compressed to its final compression length, preferably about one inch and more preferably about 0.75 inches. Depending on the number of sprinklers open and the operating flow requirements of the each open sprinkler, the location of the sealer 48 relative to the sealing surface 28 will preferably vary accordingly. In FIG. 5 the sealer 148 is shown in the tripped condition and in FIG. 6 the sealer 148 is shown at its maximum distal position. The sealer spring member 172 compression length correspondingly varies in response to the actual fluid demand at the first outlet 116. Thus, the preferred valve 110 provides for varied fluid flow at the first outlet 116 in response to the demand at the first outlet 116 by varying the distance between the seal surface 157 of the movable component 142a and the sealing surface 128 of the stationary component 142b of the flow controller assembly 142. Moreover, in operation the valve 110 preferably defines i) an operating flow path between the inlet 114 and the first outlet 116 and ii) a standby flow path between the inlet 114 and second outlet 118, in which the flow controller 142 partially obstructs the operating and standby flow paths with a greater obstruction to the standby flow path than to the operating flow path upon actuation or operation of the valve 110. In one preferred operation of the valve 110 when provided with a water flow rate of 150 gpm out of the first outlet 116, the valve preferably has a head loss or differential pressure between the inlet 114 and first outlet 116 of no more than three pounds per square inch (3 psi.). Once the valve 110 is tripped, the head portion 152 is spaced from the sealing surface 128 to preferably provide a fluid flow to a most hydraulically remote sprinkler coupled to the valve 110 ranging from at least about 5 gpm to about 8 gpm for a standard residential water pressure supplied at the inlet 114.

Following the trip and operation of the valve 110, the valve 110 can be reset to its standby condition and full domestic fluid flow restored by returning the sealer 148 to the seated condition against the sealing surface 128 of the valve 110 and locating the occluder 150 in its initial position spaced from the stop surface 130. Preferably, the valve 110 automatically resets itself to the standby position by closing off the valve 110 from the domestic system and allowing the valve above and below the seal surface 128 to reach equal pressure. The weight member 173 biases the sealer 148 into engagement with the sealing surface 128. Preferably under the force of gravity, the weight of the weight member 173 biases the sealer 148 into engagement with the sealing surface 128. More preferably, resetting of the valve 110 and the movable component 142a of the flow controller assembly 142 to its seated position can be performed by following the valve setting procedures previously described. The radial gap widths between the outer surface of the mobile component 142a of flow controller assembly 142 and the inner surfaces of the first and second annular members 200, 202 of the stationary component 142b allow for the flow controller to return to its seated condition by facilitating rapid equalization of fluid pressure at the inlet 114 and first and second outlets 116, 118 once the valve 110 has been isolated.

The terms "about" or "approximately," as used throughout this application in the context of numerical values and ranges, refers to values or ranges that approximate or are close to the recited values or ranges such that the described embodiments can perform and/or function as intended or apparent to the skilled person from the teachings and descriptions contained herein. Thus, these terms, "about" or "approximately," encompass values beyond those resulting from systematic error. These terms make explicit what is implicit. It should be understood that all ranges set forth herein in throughout the application include all numbers or values thereabout or therebetween of the numbers of the range. The ranges of values associated with the various preferred embodiments expressly denominate and set forth all integers, decimals and fractional values in the range. Therefore, any parameter such as for example, a length, area, volume, rate or pressure that is described as being "about" some value, includes the express value described, and could further includes the integer, decimal or fractional value thereabout or therebetween. Moreover, for any numerical values provided herein, it should be understood that the stated value further includes the value itself and an integer, decimal or fractional value thereabout.

While the present invention has been disclosed with reference to certain embodiments, numerous modifications, alterations, and changes to the described embodiments are possible without departing from the sphere and scope of the present invention. Therefore features of one embodiment of the dual-purpose fluid control valve can be combined with the features of another embodiment provided the resultant configuration functionally provides a dual-purpose valve as described herein. For example, the downstream spring 78 can be used in combination with the weight member 173' to support and bias the sealer 148 into engagement with the sealing surface 128. Accordingly, it is intended that the present invention not be limited to the described embodiments, but that it has the full scope defined by the language of the following claims, and equivalents thereof.

What is claimed is:

1. A valve, comprising:
a valve body having a valve body wall defining an interior chamber having a longitudinal axis, the valve body wall further defining a first port, a second port and a third port, each in communication with the interior chamber, the valve body wall defining a sealing surface disposed within the interior chamber along the longitudinal axis to separate the first and second ports; and
a flow controller moveably disposed within the interior chamber, the flow controller having a first component and a second component operatively coupled to the first component, the first component having a proximal end, a distal end and an operating position that defines a minimum distance from the sealing surface, the first component having an opening at the proximal end and an opening at the distal end, the second component of the flow controller having a varying distance relative to the sealing surface when the first component is in the operating position, the openings at the proximal and distal ends of the first component define a flow path through the first component from the first port to at least one of the second and third port.

2. The valve of claim 1, the valve body wall comprising an outer wall and an insert disposed within the outer wall, the insert defining the sealing surface of the valve body wall.

3. The valve of claim 1, the first component having a frustoconical outer surface disposed about the longitudinal axis and narrowing in a direction towards the second port.

4. The valve of claim 1, the second component including a shaft member slidably disposed within a channel defined by the first component.

5. The valve of claim 1, the flow controller having a standby position defining a minimum distance between the second component and the sealing surface, the standby position defining a sealed standby flow path aperture between the first and second ports and defining a maximum standby flow path aperture between the first and third ports, the operating position defining a variable operating flow path aperture between first and second ports and defining a minimum non-zero flow path aperture between the first and third ports.

6. The valve of claim 1, the sealing surface disposed in a plane that is orthogonal to the longitudinal axis, the flow controller including a seal surface for mating with the sealing surface, the seal surface being a single moving seal of the valve.

7. The valve of claim 6, the flow controller defining an engagement surface disposed to face the sealing surface, the valve further comprising a seal disposed between the sealing surface and the mating surface.

8. The valve of claim 7, the seal being a single moving seal of the valve.

9. The valve of claim 1, the flow controller having a standby position defining a minimum distance between the second component and the sealing surface, the first component of the flow controller having a varying distance relative to the sealing surface when the second component is in the standby position.

10. The valve of claim 9, the valve body defining an operating flow path between the first and second ports and defining a standby flow path between the first and third ports, the flow controller in the operating position being disposed to partially obstruct the operating and standby flow paths with a greater obstruction to the standby flow path than to the operating flow path.

11. The valve of claim 10, the flow controller in the standby position being disposed to fully obstruct the operating flow path.

12. The valve of claim 9, further including a spring disposed between the first and second components at an initial spring length when the flow controller is in the standby position with the first component at a maximum distance from the sealing surface, wherein further when the flow controller is in the operating position and the first component is at the minimum distance from the sealing surface such that the spring is at the initial spring length so as to define a tripped position of the flow controller, and wherein the second component is at a maximum distance from the sealing surface such that the spring is compressed to a fully compressed length.

13. The valve of claim 12, wherein the first component comprises an occluder and the second component comprises a sealer having a head portion and a shaft portion having a proximal end and a distal end, the head portion being located at the proximal end of the shaft with the spring and the occluder being disposed about the shaft portion such that the fully compressed length of the spring locates the occluder at the distal end of the shaft portion.

14. The valve of claim 13, wherein the interior chamber includes a first interior passageway and a second interior passageway, the first and second interior passageways being axially aligned and spaced along the longitudinal axis, each passageway having a proximal surface and a distal surface, the proximal surface of the first interior passageway defining the sealing surface and the distal surface of the second interior passageway defining a stop surface.

15. The valve of claim 14, wherein the valve includes a first insert sleeve portion affixed to modify the first interior passageway for receiving the head portion and a second insert sleeve portion affixed to modify the second interior passageway for receiving the occluder, such that the first interior passageway has a cross-sectional area that is smaller than the cross-sectional area of the second interior passageway.

16. A valve for controlling the flow of water between a domestic supply and a fire protection system supply, the valve comprising:
a valve body having a proximal end and a distal end:
an inlet at the distal end of the body for connection to a water supply;
a first outlet at the proximal end of the body for connection to a fire sprinkler system;
a second outlet located between the inlet and the first outlet for connection to a domestic water system; and
an inner surface defining an interior chamber and central longitudinal axis of the valve body, the inlet being centrally aligned with the central longitudinal axis and in communication with the central chamber, the first outlet being centrally aligned along the central longitudinal axis and in communication with the interior chamber, the second outlet being disposed between the inlet and the first outlet centrally aligned along an axis perpendicular to the central longitudinal axis, the second outlet being in communication with the interior chamber, the inner surface further defining a sealing surface about the central longitudinal axis spaced at a fixed distance from the first outlet and a stop surface about the central longitudinal axis spaced at a fixed distance from the second outlet, the stop surface being spaced from the sealing surface so as to divide the chamber and separate the inlet and first and second outlets,
a flow controller disposed within the interior chamber centrally aligned to the central longitudinal axis, the flow controller having
a sealer including a head portion biased against the sealing surface and a shaft portion depending from the head portion, the shaft portion having a proximal and a distal end;
an occluder disposed about the shaft portion of the sealer such that the occluder can translate between an initial position at the proximal end of the shaft and a final position at the distal end of the shaft, the occluder having a member with a first end defining an opening, a second end defining an opening, the openings at the first end and the second end of the member defining a flow path through the member which water flows from the inlet to at least one of the first outlet and the second outlet; and
a spring coupled to the shaft portion of the sealer so as to bias the occluder in the initial position, the spring having a compressed length to locate the occlude along the shaft portion of the sealer distal of the initial position.

17. The valve of claim 16, wherein the flow controller translates between the sealing surface and the stop surface to control a flow of water from the inlet to each of the first and second outlets so as to define a standby condition, a tripped condition and an operated condition of the valve, wherein the standby condition the head portion of the sealer is in engagement with the sealing surface to prevent the flow of fluid to the first outlet and the occluder is spaced from the stop surface such that water flows to the second outlet, wherein the tripped condition the head portion of the sealer is spaced from the sealing surface and the occluder is engaged with the stop surface to permit the flow of water to the first outlet and a reduction in flow to the second outlet, wherein the operated condition the spring is compressed to the compressed length and the occluder and the shaft portion translate relative to one another, the compressed length of the spring being variable as a function of the pressure distal of the head portion to compress the spring.

18. The valve of claim 16, wherein when the minimum compression length of the spring defines the final position of the occluder at the distal end of the shaft portion, the spring having a spring rate ranging from about 5 to about 8 pounds-force per inch, the minimum compression length defining a load ranging from about 6 to 10 pounds.

19. The valve of claim 16, wherein the occluder has a proximal end, a distal end and an external surface between the proximal end distal ends, the distal end greater than the proximal end such that the external surface of the occluder is substantially a frustrum.

20. The valve of claim 16, wherein the interior surface of the body defines a first interior passageway and a second interior passageway, the first and second interior passageways being axially aligned and spaced along the central longitudinal axis, each passageway having a proximal surface and a distal surface, the proximal surface of the first interior passageway defining the sealing surface and the distal surface of the second interior passageway defining the stop surface.

21. The valve of claim 20, wherein the inner surface of the first interior surface and the second interior surface define equal cross-sectional areas, the valve including a first insert sleeve portion affixed to modify the first interior passageway for receiving the head portion and a second insert sleeve portion affixed to modify the second interior passageway for receiving the occluder, the modified first interior passageway having a cross-sectional area that is smaller than the cross-sectional area of the modified second interior passageway.

22. A valve for controlling the flow of water between a domestic supply and a fire protection system supply, the value comprising:
    a valve body having a proximal end and a distal end:
        an inlet at the distal end of the body for connection to a water supply
        a first outlet at the proximal end of the body for connection to a fire sprinkler system;
        a second outlet located between the inlet and the first outlet for connection to a domestic water system; and
        an inner surface defining an interior chamber and central longitudinal axis of the value body, the inlet being centrally aligned with the central longitudinal axis and in communication with the central chamber, the first outlet being centrally aligned along the central longitudinal axis and in communication with the interior chamber, the second outlet being disposed between the inlet and the first outlet centrally aligned along an axis perpendicular to the central longitudinal axis, the second outlet being in communication with the interior chamber, the inner surface further defining a sealing surface about the central longitudinal axis spaced at a fixed distance from the first outlet and a stop surface about the central longitudinal axis spaced at a fixed distance from the second outlet, the stop surface being spaced from the sealing surface so as to divide the chamber and separate the inlet and first and second outlets,
    a flow controller disposed within the interior chamber centrally aligned to the central longitudinal axis, the flow controller having
        a sealer including a head portion biased against the sealing surface and a shaft portion depending from the head portion, the shaft portion having a proximal and a distal end;
        an occluder disposed about the shaft portion of the sealer such that the occluder can translate between an initial position at the proximal end of the shaft and a final position at the distal end of the shaft, the occluder defining a flow path through which water flows from the inlet to at least one of the first outlet and the second outlet; and
        a spring coupled to the shaft portion of the sealer so as to bias the occluder in the initial position, the spring having a compressed length to locate the occluder along the shaft portion of the sealer distal of the initial position,
    wherein the occluder has a proximal end, a distal end and an external surface between the proximal end distal ends, the distal end greater than the proximal end such that the external surface of the occluder is substantially a frustrum,
    wherein the proximal end of the occluder at the proximal end includes a frame structure defining a plurality of openings through which a flow of water can flow from the inlet to at least one of the first outlet and second outlet, the frame structure defining an central opening for receiving the shaft portion of the sealer.

23. A dual-purpose fluid control valve comprising:
    a body having a first chamber having a fixed volume and a second chamber having a fixed volume;
    a first fluid outlet in communication with the first chamber;
    a second fluid outlet in communication with the second chamber; means for controlling a rate of fluid through the second chamber based on a fluid demand at the second fluid outlet while controlling another rate of fluid flow from the first chamber to the first fluid outlet, wherein the body defines a sealing surface and the body further defines a stop surface axially spaced from the sealing surface, wherein further the means includes a flow controller having a sealer including a head portion and an occluder that translates between the sealing surface and the stop surface so as to define a standby condition, a tripped condition and an operated condition of the valve, wherein in the standby condition the sealer is in engagement with the sealing surface to prevent the flow of fluid to the second fluid outlet and the occluder is spaced from the stop surface such that water flows to the first fluid outlet, wherein in the tripped condition a head portion of the sealer is spaced from the sealing surface and the occluder is engaged with the stop surface to permit the flow of water to the second fluid outlet and a reduction in flow to the first fluid outlet, and wherein in the operated condition the occluder and the sealer translate relative to one another, the relative translation between the occluder and the sealer being a function of the pressure at the fluid demand at the second outlet; wherein the sealer further includes a shaft portion depending from the head portion, the shaft portion having a proximal and a distal end; the occluder is disposed about the shaft portion of the sealer such that the occluder can translate between an initial position at the proximal end of the shaft and a final position at the distal end of the shaft; and
    a spring coupled to the shaft portion of the sealer so as to bias the occluder in the initial position, the spring having a compressed length to locate the occluder along the shaft portion of the sealer distal of the initial position,
    wherein when the minimum compression length of the spring defines the final position of the occluder at the distal end of the shaft portion, the spring has a spring rate ranging from about 5 to about 8 pounds-force per inch, and the minimum compression length. defines a load ranging from about 6 to 10 pounds.

24. A valve for controlling the flow of water between a domestic supply and a fire protection system supply, the valve comprising:
    a valve body having a proximal end and a distal end:
    an inlet at the distal end of the body for connection to a water supply;
    a first outlet at the proximal end of the body for connection to a fire sprinkler system; and
    a second outlet located between the inlet and the first outlet for connection to a domestic water system;
    an inner surface defining an interior chamber and central longitudinal axis of the valve body, the inlet being centrally aligned with the central longitudinal axis and in communication with the central chamber to feed water into the chamber, the first outlet being centrally aligned along the central longitudinal axis and in communication with the interior chamber for supplying water to the fire sprinkler system, the second outlet being disposed between the inlet and the first outlet centrally aligned along an axis perpendicular to the central longitudinal axis, the second outlet being in communication with the interior chamber for supplying water to the domestic water system, the inner surface further defining a sealing surface about the central longitudinal axis spaced at a fixed distance from the first outlet and a stop surface about the central longitudinal axis spaced at a fixed distance from the second outlet, the stop surface being spaced from the sealing surface so as to divide the chamber and separate the inlet and first and second outlets, and a flow controller disposed within the interior chamber centrally aligned to the central longitudinal axis, the flow controller having:

a sealer including a head portion biased against the sealing surface and a shaft portion depending from the head portion, the shaft portion having a proximal and a distal end;

an occluder disposed about the shaft portion of the sealer such that the occluder can translate between an initial position at the proximal end of the shaft and a final position at the distal end of the shaft, and a spring coupled to the shaft portion of the sealer so as to bias the occluder in the initial position, the spring having a compressed length to locate the occluder along the shaft portion of the sealer distal of the initial position; wherein the occluder has a proximal end, a distal end and an external surface between the proximal and distal ends, the distal end of the occluder being greater than the proximal end of the occluder such that the external surface of the occluder is substantially a frustrum.

* * * * *